United States Patent [19]
Hirasawa et al.

[11] Patent Number: 5,933,187
[45] Date of Patent: Aug. 3, 1999

[54] VIDEO CAMERA APPARATUS WITH AUTOMATIC FOCUS OPERATION DEPENDENT ON ELECTRONIC ZOOM CONDITION

[75] Inventors: Masahide Hirasawa, Kanagawa-ken; Tatsuya Yamazaki, Tokyo; Hiroto Ohkawara, Ibaraki-ken, all of Japan

[73] Assignee: Canon Kabushiki Kaisha, Tokyo, Japan

[21] Appl. No.: 08/632,919

[22] Filed: Apr. 16, 1996

Related U.S. Application Data

[63] Continuation of application No. 08/248,502, May 24, 1994.

[30] Foreign Application Priority Data

May 27, 1993 [JP] Japan .................................. 5-126182
May 28, 1993 [JP] Japan .................................. 5-127077
May 28, 1993 [JP] Japan .................................. 5-127078

[51] Int. Cl.⁶ .................................................. H04N 5/262
[52] U.S. Cl. ........................... 348/240; 348/347; 348/358
[58] Field of Search .............................. 348/240, 241, 348/345, 346, 347, 363, 358, 354; 396/85, 93

[56] References Cited

U.S. PATENT DOCUMENTS

| | | | |
|---|---|---|---|
| 4,843,475 | 6/1989 | Imai | 348/358 |
| 4,924,317 | 5/1990 | Hirao et al. | 348/351 |
| 5,140,357 | 8/1992 | Suda et al. | 348/347 X |

*Primary Examiner*—Wendy Garber
*Assistant Examiner*—Aung S. Moe
*Attorney, Agent, or Firm*—Robin, Blecker & Daley

[57] ABSTRACT

A video camera includes an image pickup device for photoelectrically converting into a video signal an optical image focused on a pickup surface of the device, a focus adjusting device for focusing the optical image on the image pickup surface, electronic magnification varying circuitry for electronically varying an image magnification by signal processing, and a control circuit for controlling an operation of the focus adjusting device in manners which differ depending on whether or not the image magnification is varied by the electronic magnification varying circuitry.

18 Claims, 22 Drawing Sheets

VIDEO CAMERA APPARATUS WITH AUTOMATIC FOCUS OPERATION DEPENDENT ON ELECTRONIC ZOOM CONDITION

This is a continuation application under 37 CFR 1.62 of prior application Ser. No. 08/248,502, filed May 5. 24, 1994.

BACKGROUND OF THE INVENTION

1. Field of the Invention

The present invention relates to a video camera apparatus provided with an automatic focus adjusting device for automatically bringing a subject into focus.

2. Description of the Related Art

It is known that an apparatus, such as a video camera, having a two-dimensional image pickup device utilizes a method of detecting the sharpness of a picture from a video signal of a subject, controlling the position of a focusing lens so that the sharpness becomes a maximum, and bringing the apparatus into focus.

In general, to evaluate the sharpness signal, either of the following signal strengths is employed: the strength of a high-frequency component of a video signal extracted by a band-pass filter or the detection strength of a defocusing width (the width of the edge portion of a subject image) contained in a video signal extracted by a differentiating circuit or the like. In a case where an ordinary subject is photographed, if the focusing lens is out of focus, for example, the level of the high-frequency component of the video signal is small, but as the focusing lens approaches an in-focus point, the level of the high-frequency component becomes larger. If the focusing lens completely reaches the in-focus point, the level of the high-frequency component reaches a maximum. Accordingly, if the aforesaid sharpness signal is small, the focusing lens is driven at as high a speed as possible in the direction in which the sharpness signal becomes greater, and as the sharpness signal becomes greater, the driving speed of the focusing lens is made lower so that the focusing lens can be made to precisely stop on "the top of a hill", i.e., so that the focusing lens can be brought into focus. Such an autofocus method is generally called a hill climbing autofocus system (hereinafter referred to as "hill climbing AF").

Conventionally, an area from which to extract the sharpness signal required for the hill climbing AF (hereinafter referred to as "distance measuring frame") is provided in the approximately central portion of a picture (refer to the frame A shown in FIG. 3) on the assumption that many photographers usually position a main subject at the central portion of a picture.

However, if the distance measuring frame is fixed in the central portion of the picture, the following problem will be experienced. If a subject which is being photographed moves out of the distance measuring frame, it is determined that the subject has disappeared, and the focusing lens is made to move in a direction in which defocusing occurs, from its current focus position at which the focusing lens is in focus, with the result that unnecessary defocusing occurs.

To solve the above-described disadvantage, a control system is considered. In the control system, the size of a distance measuring frame is made variable so that it is possible to always select an optimum distance measuring frame by cyclically switching the size of the distance measuring frame between different sizes.

According to the control system, during restarting of driving of the focusing lens which is in focus, it is possible to perform an AF operation using an optimum distance measuring frame, whereby it is possible to effect a rapid and reliable AF operation.

However, in the above-described example, since a distance measuring frame to be used during zooming is fixed to a small distance measuring frame, if zooming is performed, for example, in the vicinity of a telephoto end during AF control using a large distance measuring frame, the large distance measuring frame is switched to the small distance measuring frame and, particularly in the case of zooming of from a wide-angle side to a telephoto side, a subject which has so far been recognized may be lost sight of. At this time, the photographic image within the picture is greatly defocused.

Regarding the control of such a distance measuring frame, there is another problem to be considered. As is known, cameras having a so-called electronic-zoom function for electronically enlarging a photographic image have recently become popular. Such a camera can realize higher-magnification zooming by combining the electronic-zoom function and an optical-zoom function, whereby it is possible to cope with various photographic conditions.

There are two methods for setting a distance measuring frame from which to obtain an AF sharpness signal relative to an angle of view which is varied by the electronic zoom. One method is to extract the AF sharpness signal from a video signal contained in the picture of an image enlarged at an image magnification, and another method is to extract the AF sharpness signal from a video signal before enlargement.

In the former case in which the AF sharpness signal is extracted from a video signal contained in the picture of an enlarged image, a high-frequency component is actually extracted from a video signal contained in the picture of a picked-up image which is horizontally thinned out, and the thus-obtained high-frequency component differs from a high-frequency component which can be extracted from the original video signal. This leads to the problem that the accuracy of an AF operation degrades or an erroneous operation easily occurs. To solve such a problem, it has been proposed to provide means for extracting an AF sharpness signal from a video signal before enlargement as preferentially as possible.

However, during an electronic-zoom operation, in a case where a video signal before enlargement is used for AF control to prevent degradation of the accuracy of an AF operation, if the size of a distance measuring frame is greater than the size of an area to be enlarged, a subject which is located outside of the picture of an enlarged area may be brought into focus.

Also, during AF control using a large distance measuring frame, if the size of the distance measuring frame is made smaller just because the electronic zoom is activated, a subject which has been recognized up to that time may be lost sight of. At this time, the focusing lens moves to a great extent, with the result that defocusing occurs or it takes a long time to again bring the focusing lens into focus.

SUMMARY OF THE INVENTION

A first object of the present invention which has been made to solve the above-described problem is to provide a video camera capable of effecting stable automatic focus adjustment even during zooming.

A second object of the present invention is to provide a video camera capable of effecting stable automatic focus adjustment irrespective of a variation of a subject image due to zooming, as well as capable of effecting a natural and smooth operation.

To achieve the above objects, in accordance with one aspect of the present invention, there is provided a video camera apparatus which comprises a first lens group for performing a magnification varying operation, a second lens group for performing a focus adjusting operation, extracting means for extracting a sharpness signal corresponding to a degree to which a subject image formed via the first and second lens groups is brought into focus, from an image pickup signal indicative of the subject image, gate means for extracting the sharpness signal relative to an area which is set in a portion of a picture, focus adjusting means for performing focus adjustment on the basis of the sharpness signal relative to the area, which is extracted by the gate means, and area selecting means for controlling the gate means to vary the area in size and determining a size of the area during a driving of the first lens group in accordance with a size of the area used before the driving of the first lens group.

A third object of the present invention is to provide a video camera having electronic-zoom means for electronically enlarging and reducing an image, which is capable of performing a stable and accurate automatic focus adjusting operation irrespective of an image variation due to an electronic-zoom operation.

To achieve the above object, in accordance with another aspect of the present invention, there is provided a video camera apparatus which comprises extracting means for extracting from an image pickup signal a sharpness signal corresponding to a degree to which a subject image is brought into focus, gate means for extracting the sharpness signal relative to an area which is set in a portion of a picture, focus adjusting means for performing focus adjustment on the basis of the sharpness signal relative to the area, which is extracted by the gate means, electronic image magnification varying means for electronically varying an image magnification of the image pickup signal read, and gate area selecting means for determining a size of the area set by the gate means, in accordance with the image magnification varied by the electronic image magnification varying means.

In accordance with the above-described arrangement, in a case where zooming toward a telephoto end is performed with a variator lens positioned in the vicinity of the telephoto end, if AF control executed immediately before the zooming uses a large distance measuring frame, the zooming is performed with the large distance measuring frame active. Accordingly, it is possible. to prevent a subject from being lost sight of during switching between the distance measuring frames. Further, since it is possible to prevent the phenomenon in which a subject suddenly disappears from the picture while the angle of view is varying, it is possible to realize stable zooming performance while maintaining stable focusing performance.

The size of a distance measuring frame which is used during the enlargement of an image by electronic zoom is made to vary according to an image magnification. Particularly while the electronic zoom is in operation (while the image magnification is varying), if the enlargement of the image is started with an AF control frame (or distance measuring frame) large, AP control is performed with the large distance measuring frame active, until the image magnification reaches a particular magnification. When the electronic zoom is stopped (the image is fixed at a particular image magnification), the size of the distance measuring frame is set according to the image magnification. Accordingly, it is possible to realize a stable AF operation which causes no unnatural defocusing during AF control while an image is being enlarged.

Another object of the present invention is to provide a video camera provided with optical-zoom means and electronic-zoom means and capable of causing both of the optical- and electronic-zoom means to smoothly perform their respective zooming operations, and further capable of stably performing an automatic focus adjusting operation free of malfunction in either of the zooming operations.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of a video camera apparatus according to the present invention will be described below in detail with reference to the accompanying drawings.

First Embodiment

Figure 1:
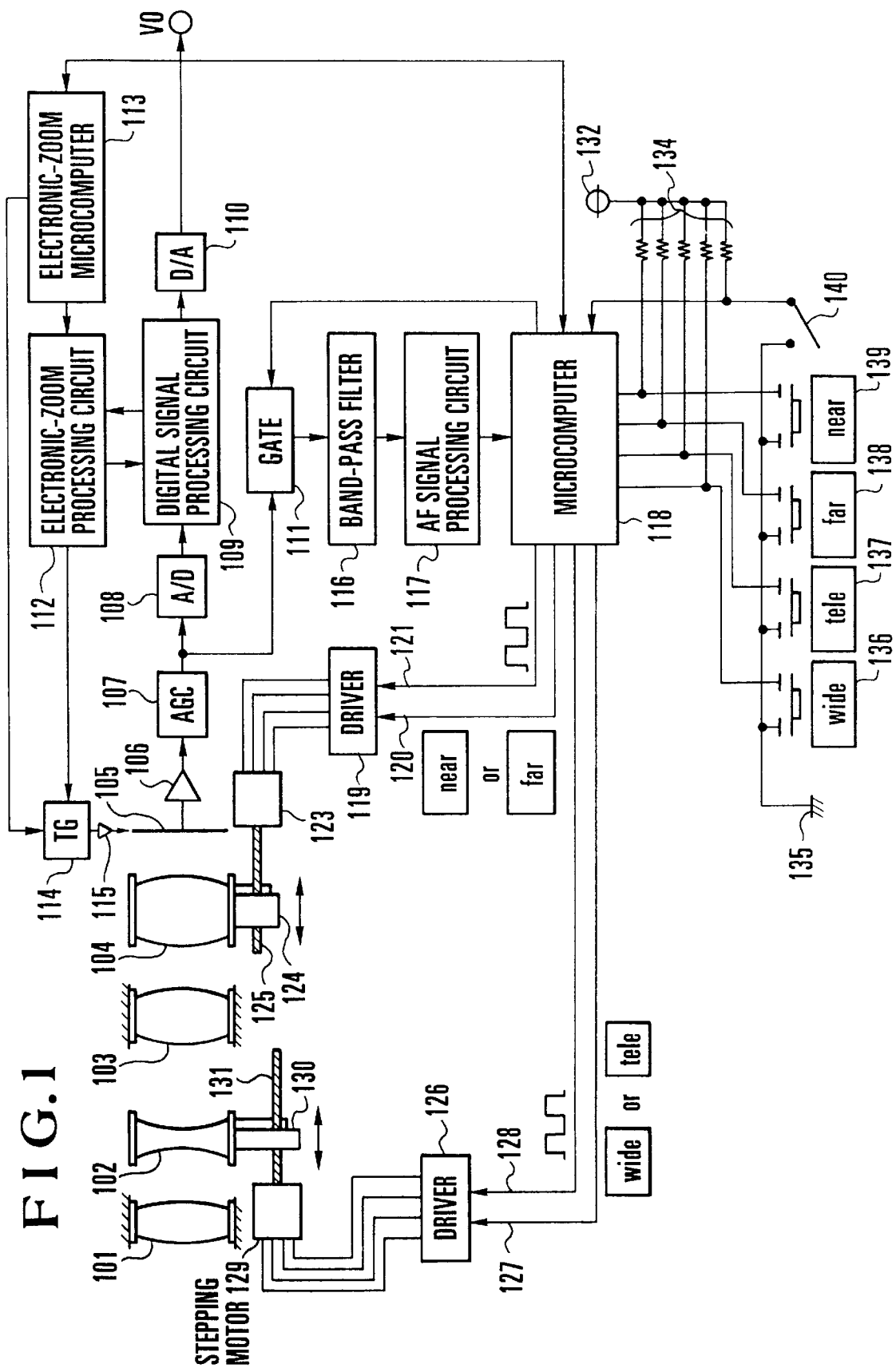
FIG. 1 is a block diagram schematically showing the arrangement of a video camera according to the present invention.

FIG. 1 is a block diagram schematically showing the arrangement of the essential parts of a first embodiment of the present invention. The following description will be made in connection with an example in which stepping motors are employed as actuators for driving a variator lens and a focusing lens.

In the arrangement shown in FIG. 1, an inner focus type of lens system is formed by constituent elements 101, 102, 103 and 104. The constituent element 101 is a first lens group which is provided as a fixed front lens group, the constituent element 102 is a second lens group for effecting magnification variation (hereinafter referred to as the "variator lens"), the constituent element 103 is a third lens group which is fixedly disposed, and the constituent element 104 is a fourth lens group provided with both a compensation function and a focusing function (hereinafter referred to as the "focusing lens"). Since the construction of the lens system does not directly relate to the present invention, description is omitted herein for the sake of simplicity.

The arrangement shown in FIG. 1 also includes an image pickup device 105 such as a CCD, an amplifier or impedance converter 106, an AGC circuit 107 for varying its gain in accordance with brightness, i.e., the level of the output signal of the amplifier 106, and executing in cooperation with iris opening/closing control the control of keeping the level of the output signal of the amplifier 106 at a constant value, an A/D converter 108, a digital signal processing circuit 109 for performing predetermined processing on a digital image pickup signal outputted from the A/D converter 108, a D/A converter 110 and a video output terminal VO.

The arrangement shown in FIG. 1 also includes a gate circuit 111 for extracting from a video signal outputted from the AGC circuit 107 only a video signal relative to the area inside of a distance measuring frame (focus detecting area) which is set in a picture, and supplying the extracted video signal to a band-pass filter 116 which is provided at the next stage. The gate circuit 111 is a switch which is arranged in such a manner that its opening and closing timing is controlled by a microcomputer 118, which will be described later, so that it is possible to vary the position at which to set the distance measuring frame within the picture as well as the size of the area surrounded by the distance measuring frame within the picture.

The arrangement shown in FIG. 1 also includes an electronic-zoom processing circuit 112 and an electronic-zoom microcomputer 113 for controlling the electronic zoom of the video camera apparatus. The specific operation of the electronic zoom will be described later. The shown arrangement also includes a timing generator (TG) 114 and a driver 115.

The shown arrangement also includes a band-pass filter 116 for extracting only a predetermined high-frequency component the level of which varies according to the state of focus, from the video signal outputted from the gate circuit 111, an AF signal processing circuit 117 for generating a focus voltage according to the state of focus on the basis of the level of the high-frequency component signal outputted from the band-pass filter 116, and the lens controlling microcomputer 118 for executing various control processings associated with lens operations, such as the operation of moving the variator lens 102 and the focusing lens 104 by the manual operation of various operating switches which will be described later, the operation of correcting a deviation of a focal plane due to the driving of the variator lens 102 by driving the focusing lens 104 on the basis of a locus which is stored in advance, and the operation of driving the focusing lens 104 toward an in-focus position on the basis of the output signal of the AF signal processing circuit 117.

The shown arrangement also includes drivers 119 and 126 for respectively outputting driving energy to stepping motors 123 and 129 in accordance with driving instructions indicated by driving step pulses supplied from the lens controlling microcomputer 118 via control lines 121 and 128, the stepping motors 123 and 129 for respectively driving the focusing lens 104 and the variator lens 102, output shafts 125 and 131 directly connected to the respective stepping motors 123 and 129, and racks 124 and 130 mashed with the respective output shafts 125 and 131. As the output shafts 125 and 131 rotate, the respective racks 124 and 130 travel in parallel with the optical axis, whereby the respective focusing lenses 104 and 102 fixed to the racks 124 and 130 are made to travel. The lens controlling microcomputer 118 also output instructions indicative of driving directions to the drivers 119 and 126 via control lines 120 and 127, respectively.

The shown arrangement also includes a power source 132 and a pull-up resistor group 134 for converting the operational state of each operating switch which will be described later into a voltage variation, a ground 135, a wide-angle switch 136 and a telephoto switch 137 for causing the variator lens 102 to travel toward its wide-angle position and its telephoto position, respectively, the wide-angle switch 136 and the telephoto switch 137 being arranged to constitute a zoom switch portion, focusing switches 138 and 139 for causing the focusing lens 104 to travel toward its infinity position and its closest-distance position, respectively, and an electronic-zoom switch 140 for turning on or off the electronic zoom.

If the electronic-zoom switch 140 is on, it is possible to continuously operate the optical zoom and the electronic zoom of the video camera apparatus by the operation of the wide-angle switch 136 and the telephoto switch 137.

The manner of driving of the stepping motors 129 and 123 for driving the variator lens 102 and the focusing lens 104 will be described below.

The lens controlling microcomputer 118 determines the driving speed of the zooming stepping motor 129 and that of the focusing stepping motor 123 to prepare rotating-frequency signals for the respective stepping motors 129 and 123. The lens controlling microcomputer 118 transmits the respective rotating-frequency signals over the control line 128 to the driver 126 for driving the zooming stepping motor 129 and over the control line 121 to the driver 119 for driving the focusing stepping motor 123.

The lens controlling microcomputer 118 also transmit signals indicative of the rotating directions of the respective stepping motors 129 and 123 to the drivers 126 and 119 over the respective control lines 127 and 120. The level (high or low) of the rotating-direction signal for the zooming stepping motor 129 is controlled according to the states of the two switches 136 and 137. The level (high or low) of the rotating-direction signal for the focusing stepping motor 123 is controlled according to the states of the two switches 138 and 139 during a manual operation, while, during an AF operation, the level (high or low) of the rotating-direction signal for the focusing stepping motor 123 is controlled according to a driving direction instruction determined by an AF processing routine in the lens controlling microcomputer 118. Each of the motor drivers 126 and 119 sets, in accordance with the rotating-direction signal for the corresponding one of the stepping motors 129 and 123, four motor excitation phases of the corresponding motor so that the four phases can take a phase relationship which enables forward rotation or reverse rotation. Each of the motor drivers 126 and 119 also outputs, in accordance with its received rotating-frequency signal, voltages (or currents) to be applied as the four motor excitation phases, while varying the voltages (or currents). In this manner, the rotating direction and the rotating frequency of each of the stepping motors 129 and 123 are controlled.

The electronic-zoom operation is performed in the following manner. In the following description, reference will be made to an electronic zoom of approximately 2× by way of example.

The lens controlling microcomputer 118 and the electronic-zoom microcomputer 113 communicate with each other to exchange information, such as information indicative of the states of the switches 136, 137 and 140, position information about the variator lens 102, and information indicative of the magnification of the electronic zoom. On the basis of such information, the electronic-zoom microcomputer 113 determines whether the electronic zoom needs to be driven.

During an electronic-zoom operation, magnification information is outputted from the electronic-zoom microcomputer 113 to both the TG 114 and the electronic-zoom processing circuit 112. The electronic-zoom processing circuit 112 outputs a gate signal to the TG 114 in accordance with the magnification information. The TG 114 serves to control the timing of the image pickup device 105 in the direction of vertical synchronization through the driver 115. In accordance with the magnification signal and the gate signal, if a particular area is to be enlarged at a magnification of, for example, 2×, an area to be enlarged is selected and only the selected area is set as an area to be scanned. Then, during each vertical blanking period only, the unnecessary charge stored in any area other than the area to be enlarged is swept from the image pickup device 105 in the vertical direction thereof, and the charge signal stored in the area to be enlarged is read out as an image pickup device output signal by generating one vertical transfer pulse for every two horizontal scanning pulses. During this time, the charge signal stored in the area in the horizontal scanning direction is vertically intermittently read out in accordance with the enlargement magnification. Thus, the image pickup output signal is read out in the state of being thinned out in a ratio of one to two scanning lines.

The read image pickup signal output is converted into a digital signal by the A/D converter 108, and the digital signal is transmitted to the digital signal processing circuit 109. The magnification information is also transmitted to the digital signal processing circuit 109 from the electronic-zoom processing circuit 112 which has received the video signal information from the digital signal processing circuit 109.

The digital signal processing circuit 109 discards digital data represented by horizontal unnecessary charges according to the magnification signal and inserts the average values of neighboring digital data representative of the image pickup signal relative to an effective area to be enlarged, between such neighboring digital data, thereby effecting horizontal interpolation. Regarding vertical interpolation, in a memory circuit provided in the digital signal processing circuit 109, the average values of two neighboring scanning lines are calculated and inserted between the two neighboring scanning lines. The resultant video signal indicative of an enlarged image is outputted to the D/A converter 110.

In the above-described manner, the electronic-zoom microcomputer 113 executes the 2× electronic-zoom operation by outputting the magnification information to both the electronic-zoom processing circuit 112 and the TG 114 while temporally varying the magnification information, for example, from 1× to 2×.

Figure 2:
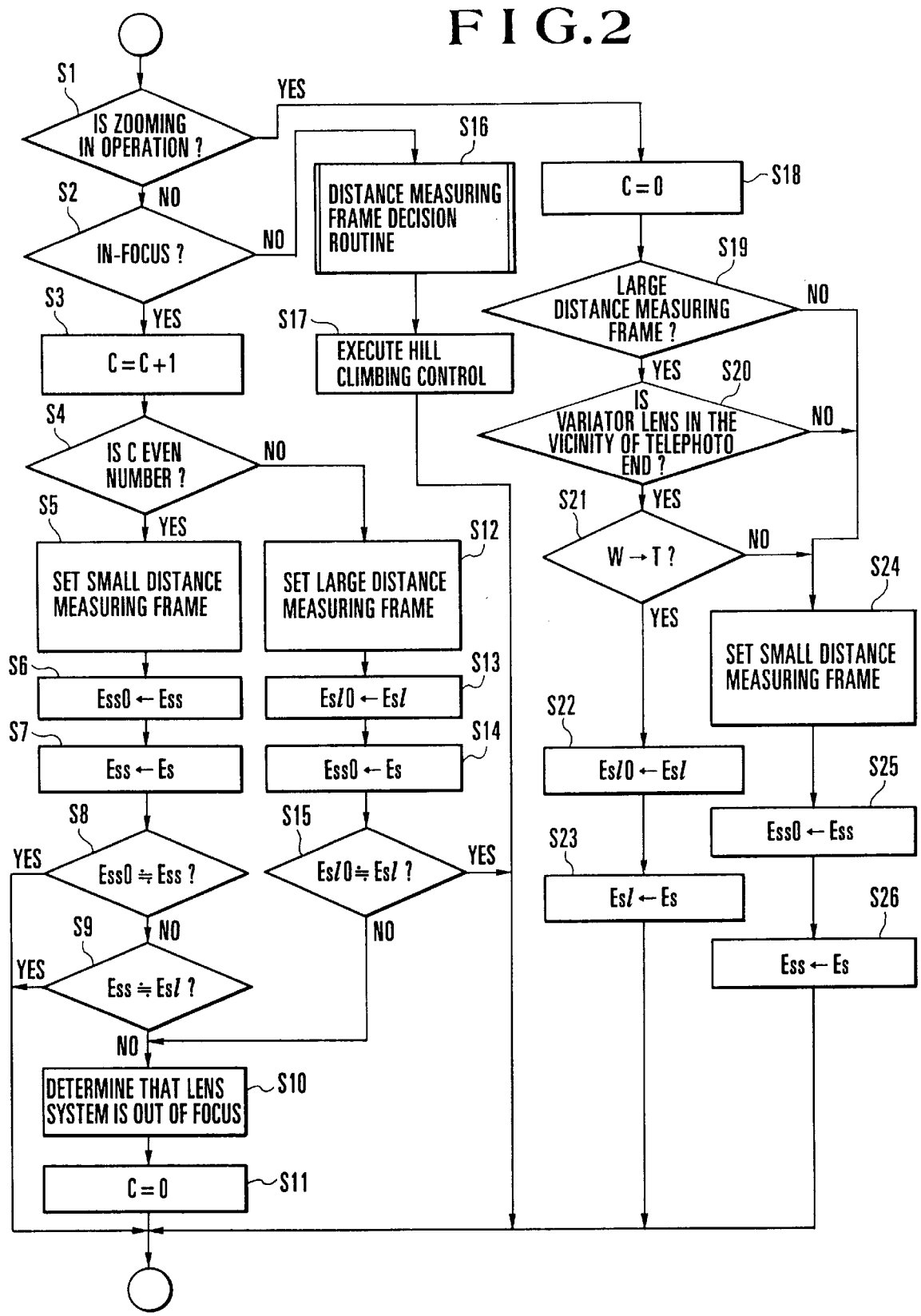
FIG. 2 is a flowchart aiding in describing the operation of controlling distance measuring frames in the video camera.

FIG. 2 is a flowchart showing a control flow for carrying out the first embodiment of the present invention, and the control sequence is processed in the lens controlling microcomputer 118. The flow shown in FIG. 2 is incorporated as a subroutine, and AF-mode processing for executing control of automatic focus adjustment in accordance with focus voltage and mutual communication processing for allowing the lens controlling microcomputer 118 and the electronic-zoom microcomputer 113 to communicate with each other are carried out before the subroutine processing is performed.

Figure 3:
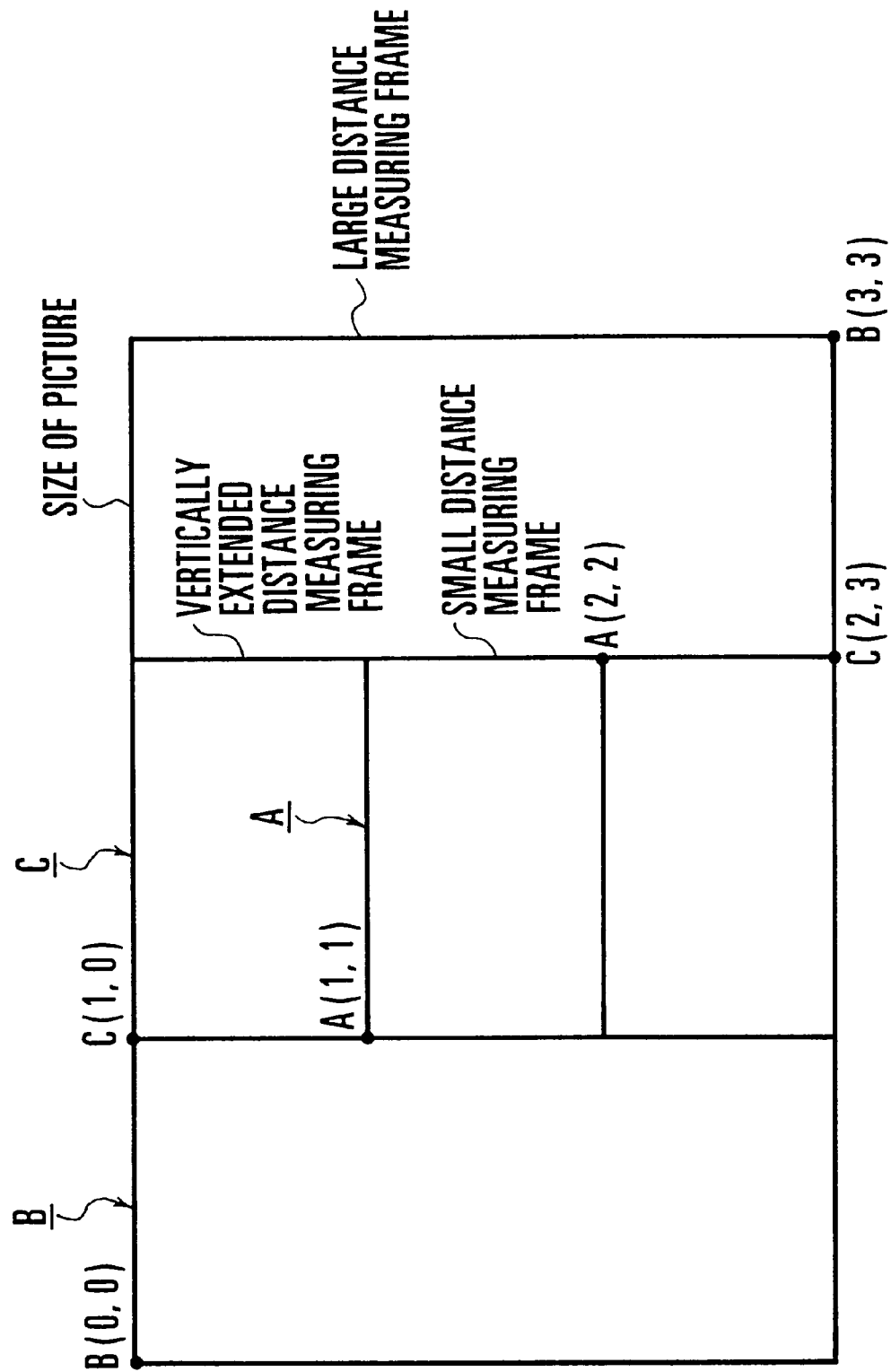
FIG. 3 is a schematic view which aids in describing control of distance measuring frames which are set in a picture.
Figure 4:
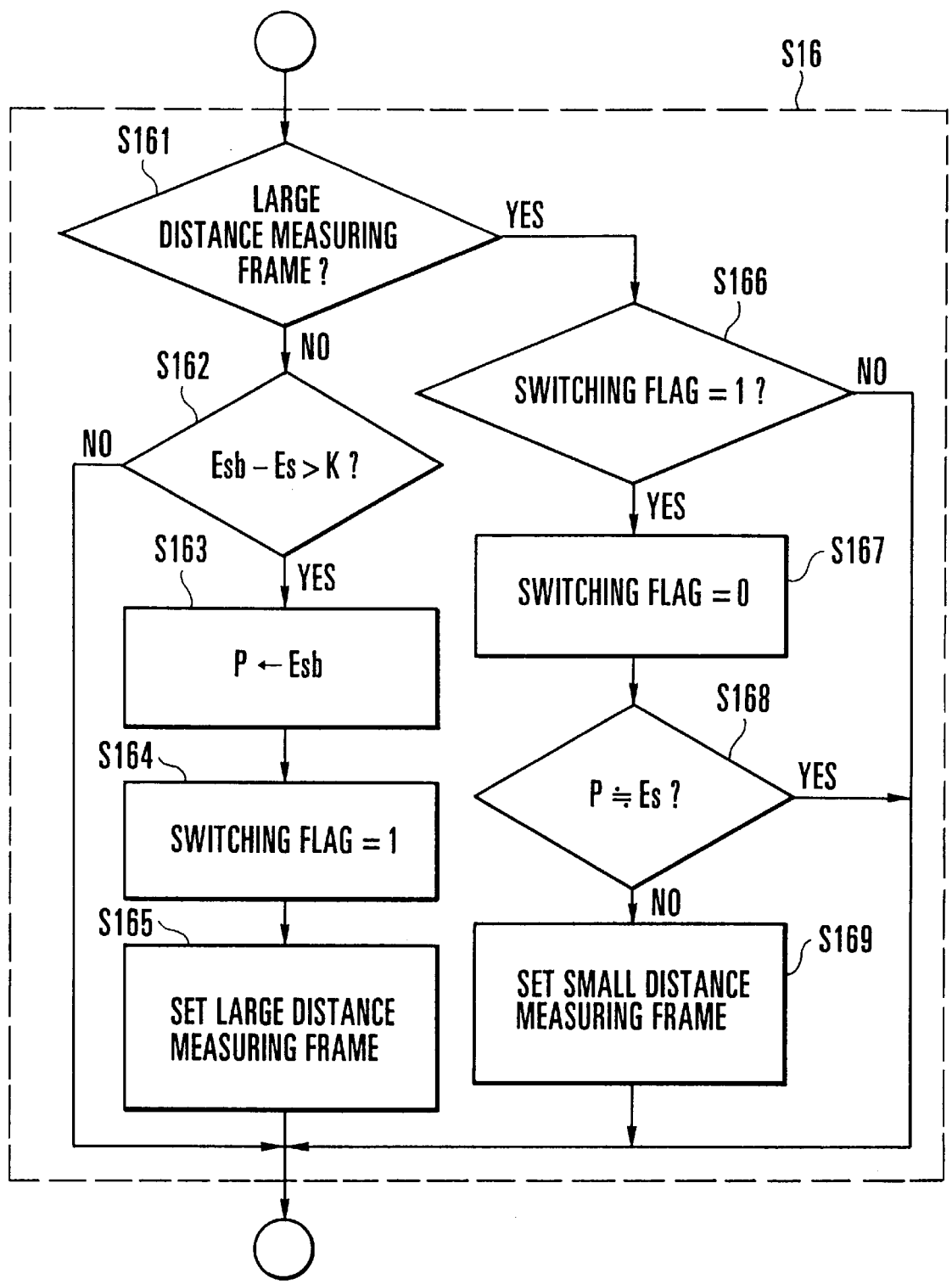
FIG. 4 is a flowchart showing the internal processing of a distance measuring frame decision routine contained in the flowchart of FIG. 2.

FIG. 3 is a schematic view of an image pickup surface which aide in describing control for distance measuring frames. FIG. 4 shows the internal processing of a distance measuring area determining routine in the flowchart of FIG. 2, and is a flowchart of an AF control portion which constitutes part of the processing performed by the lens controlling microcomputer 118. Position information about each of the variator lens 102 and the focusing lens 104 and the aforesaid sharpness signal are inputted into the lens controlling microcomputer 118. The lens controlling microcomputer 118 performs hill climbing AF processing on the basis of an internal program in accordance with the strength of the sharpness signal, and outputs a lens driving/stropping instruction to the motor driver 119 connected to the driving actuator for the focusing lens 104, thereby effecting auto-focus control.

The processing shown in FIG. 2 is executed within a constant time period (for example, a vertical synchronizing period). In Step S1 of FIG. 2, it is determined whether zooming is being performed. If it is determined that no zooming is being performed, it is determined in Step S2 whether the lens system is in focus. If the lens system is in focus, a count value C is incremented, and it is determined in Step S4 whether the count value C is an odd number.

If it is determined in Step S4 whether the count value C is an even number, the process proceeds to Step S5, in which a small distance measuring frame is set (for example, the distance measuring frame indicated by "A" in FIG. 3 is selected). In Step S6, a sharpness signal (small distance measuring frame signal) Ess which was obtained through the previous distance measuring operation using the small distance measuring frame is substituted for a previous value Ess0 of the small distance measuring frame signal. In Step S7, a sharpness signal Es extracted from the area surrounded by the current distance measuring frame is substituted for the current value Ess of the small distance measuring frame signal. Then, the process proceeds to Step S8.

In this flow, the operation of changing one distance measuring frame for another distance measuring frame is performed by supplying a control signal for changing areas to be extracted, from the lens controlling microcomputer 118 to the gate circuit 111 for extracting a video signal relative to a partial area from a video signal relative to the entire picture.

On the other hand, if it is determined in Step S4 that the count value C is an odd number, a large distance measuring frame is set in Step S12 (for example, the distance measuring frame indicated by "B" in FIG. 3 is selected). In Step S13, a sharpness signal (large distance measuring frame signal) Esl which was obtained through the previous distance measuring operation using the large distance measuring frame is substituted for a previous value Esl0 of the large distance measuring frame signal. In Step S14, the sharpness signal Es extracted from the area surrounded by the current distance measuring frame is substituted for the current value Esl of the large distance measuring frame signal. Then, the process proceeds to Step S15.

In Step S8, it is determined whether the previous value Ess0 and the current value Ess of the small distance measuring frame signals are approximately equal. If the answer is YES, i.e., if Ess0=Ess, it is determined that the lens system is in focus, and the present processing is brought to an end. If the answer in Step S8 is NO, it is determined in Step S9 whether the current value Ess of the small distance measuring frame signal and the current value Esl of the large distance measuring frame signal are approximately equal. If the answer is YES, i.e., if Ess=Esl, it is determined that a subject of interest has moved or the camera has been panned and the subject has deviated from the small distance measuring frame. Then, the present processing is brought to an end.

If the answer in Step S9 is NO, i.e., if the current value Ess of the small distance measuring frame signal and the current value Esl of the large distance measuring frame signal are greatly different from each other, it is determined that the distance to the subject has greatly varied. In Step S10, it is determined that the lens system is out of focus, and in Step S11 the count value C is cleared. Then, the present processing is brought to an end.

In this case, when the present processing is to be next executed, if no zooming is being performed, the answer in Step S2 is NO, and, in Step S16, processing for newly setting a distance measuring frame (which processing will be described later in detail) is performed. The process proceeds to Step S17, in which hill climbing control is performed using the distance measuring frame determined in Step S16.

In Step S15, it is determined whether the previous value Esl0 and the current value Esl of the large distance measuring frame signals are approximately equal. If the answer is YES, it is determined that the lens system is in focus, and the present processing is brought to an end. If the answer in Step S15 is NO, i.e., if the current value Esl are greatly different from the previous value Esl0, the process proceeds to Step S10. Accordingly, in this case, when the present processing is to be next executed, if no zooming is being performed, the hill climbing control of Step S17 is performed after the processing of Step S16 is executed.

Incidentally, if the large distance measuring frame is set, since the small distance measuring frame is contained in the large distance measuring frame, it is not necessary to make a comparison between the current value Ess of the small distance measuring frame signal and the current value Esl of the large distance measuring frame signal.

However, if the entire small distance measuring frame is not contained in the large distance measuring frame, the decision of Step S9 is needed.

If it is determined in Step S2 that the lens system is out of focus, the processing of newly setting a distance measuring frame is performed in the distance measuring frame decision routine of Step S16.

Step S16 includes the steps shown in FIG. 4. During hill climbing control, if the position of a subject deviates from the center of the picture during panning or the like, the focusing lens may move in a direction in which unnecessary defocusing occurs to increase the degree of defocusing irrespective of the intention of a photographer. The processing shown in FIG. 4 is provided for preventing occurrence of such an operation.

In Step S161, it is determined whether the current distance measuring frame is the large distance measuring frame. If the answer is No, the process proceeds to Step S162, in which the current value Es of the sharpness signal is compared with a value Esb of the sharpness signal which was obtained one vertical synchronizing period before, the value Esb being determined by a sharpness signal inputting routine separate from the present routine, and it is determined whether the current value Es is less than the previous value Esb by a threshold K, i.e., Esb−Es>K (K is a positive constant).

If the answer in Step S162 is NO, the processing of Step S16 is brought to an end, and the process proceeds to the hill climbing control of Step S17. If the answer in Step S162 is YES, it is determined that the subject is not located at the current subject distance from the small distance measuring frame. To confirm whether the subject has moved out of the small distance measuring frame or the subject distance has greatly varied, in Step S163, the sharpness signal value Esb which was obtained one vertical synchronizing period before is set to a constant P and the constant P is memorized. In Step S165, switching to the large distance measuring frame is performed.

In this case, in Step S164, a switching flag is set which indicates that the switching to the distance measuring frame has been performed. In the next step S16, when the distance measuring frame decision routine is to be executed, the process proceeds to Step S166 since the large distance measuring frame has been set.

If it is determined in Step S161 that the current distance measuring frame is the large distance measuring frame, it is determined in Step S166 whether the switching flag has been set. If the switching flag has been cleared, the processing of Step S16 is brought to an end and the process proceeds to Step S17.

If it is determined in Step S166 that the value of the switching flag is "1", the switching flag is cleared in Step S167 and it is determined in Step S168 whether the current value Es of the sharpness signal obtained by using the large distance measuring frame and the constant P memorized in Step S163 are approximately equal.

If the answer in Step S168 is YES, it is determined that the subject has moved out of the small distance measuring frame, although it is determined in Step S162 that the subject is not located at the current subject distance from the small distance measuring frame. The process passes through the processing of Step S16 with the large distance measuring frame selected. In this case, when Step S16 is to be next executed, it is determined in Step S166 that the switching flag has been cleared, and hill climbing control is performed with the large distance measuring frame selected, until the lens system reaches an in-focus position.

On the other hand, if the answer in Step S168 is NO, it is determined that the subject distance has greatly varied, and switching to the small distance measuring frame is performed. The process passes through the processing of Step S16.

Accordingly, if it is determined in Step S15 that the lens system is out of focus with the large distance measuring frame selected, hill climbing control is performed with the large distance measuring frame selected. On the other hand, if it is determined in Step S9 that the lens system is out of focus with the small distance measuring frame selected, hill climbing control is executed in the following manner. If the amount of variation of the sharpness signal is small, the hill climbing control is continued with the small distance measuring frame selected, until the lens system is focused or zoomed. If the amount of variation of the sharpness signal is large, a signal contained in the large distance measuring frame is examined and it is determined whether the subject has moved or the subject distance has varied. If it is determined that the subject has moved, the small distance measuring frame is set and the hill climbing control is continued with the small distance measuring frame selected, until the lens system is focused or zoomed. If it is determined that the subject distance has varied, the large distance measuring frame is set and the hill climbing control is continued with the large distance measuring frame selected, until the lens system is focused or zoomed.

The following description is made in connection with one feature of the present invention, i.e., the control of the distance measuring frames which is executed during zooming. Specifically, if it is determined in Step S1 that zooming is being performed, the process proceeds to Step S18, in which the count value C is cleared. In Step S19, it is determined whether the current distance measuring frame is the large distance measuring frame. In the case of the small distance measuring frame, the processing of Steps S24, S25 and S26, that is, processing identical to the processing of Steps S5, S6 and S7, is performed, and the present processing is brought to an end. The reason why the small distance measuring frame is set in the case of zooming is that if the large distance measuring frame is set, subjects will disappear from the picture one after another with a variation in an angle of view, so that the amount of variation of the sharpness signal increases and information obtained from the large distance measuring frame becomes substantially meaningless.

FIG. 3 is a view showing a setting example of each of the distance measuring frames. The frame A indicates the small distance measuring frame, and the frame B indicates the large distance measuring frame. At each point A(x, y) and B(x, y), x and y indicate horizontal and vertical positions, respectively. By varying such a point, it is possible to vary the size of the corresponding distance measuring frame within the picture.

If it is determined in Step S19 that the current distance measuring frame is the large. distance measuring frame, it is determined in Step S20 whether the current position of the variator lens 102 is in the vicinity of a telephoto end. If the answer is NO, the process proceeds to Step S24. If the answer is YES, it is determined in Step S21 whether the direction of the zooming is from a wide-angle side toward a telephoto side, i.e., it is determined which of the zoom switches 136 and 137 has bee pressed. If the wide-angle switch 136 has been pressed, the process proceeds to Step S24. If the telephoto switch 137 has been pressed, the process proceeds to Step S22, in which the sharpness signal (large distance measuring frame signal) Esl which was obtained with the large distance measuring frame is substituted for the previous value Esl0 of the large distance measuring signal. In Step S23, the sharpness signal Es extracted from the area surrounded by the current distance measuring frame is substituted for the current value Esl of the large distance measuring frame. The process passes through the present processing.

In the above-described flowchart, the processing of Steps S22 and S23 is similar to the processing of Steps 13 and S14.

Second Embodiment

The following description is made in connection with the control of a distance measuring frame which is performed during the operation of the electronic zoom for electronically enlarging a photographic image. In the case of an arrangement provided with an electronic-zoom function, unlike an optical zoom, the angle of view of the picture of an electronically zoomed image does not always correspond to the picture of an image picked up by an image pickup device, i.e., the angle of view of the picture of the enlarged image differs from the angle of view of the picture of the image picked up by the image pickup device. Accordingly, it is necessary to set an optimum distance measuring frame by performing processing according to each individual angle of view.

There are two methods for setting a distance measuring frame from which to obtain an AF sharpness signal relative to the angle of view which is varied by the electronic zoom. One method is to extract the AF sharpness signal from a video signal contained in the picture of an image enlarged at an image magnification, and another method is to extract the AF sharpness signal from a video signal before enlargement.

In the former case in which the AF sharpness signal is extracted from a video signal contained in the picture of an enlarged image, a high-frequency component is actually extracted from a video signal contained in the picture of a picked-up image which is horizontally thinned out, and the thus-obtained high-frequency component differs from a high-frequency component which can be extracted from the original video signal. This leads to the problem that the accuracy of an AF operation degrades or an erroneous operation easily occurs. To solve such a problem, it has been considered to adopt means for extracting an AF sharpness signal from a video signal before enlargement as preferentially as possible.

However, during an electronic-zoom operation, in a case where a video signal before enlargement is used for AF control to prevent degradation of the accuracy of an AF operation, if the size of a distance measuring frame is greater than the size of an area to be enlarged, a subject which is located outside of the picture of an enlarged area may be brought into focus.

Also, during AF control using a large distance measuring frame, if the size of the distance measuring frame is made smaller just because the electronic zoom is activated, a subject which has been recognized up to that time may be lost sight of. At this time, the focusing lens moves to a great extent, with the result that defocusing occurs or it takes a long time to again bring the focusing lens into focus.

A second embodiment of the present invention which will be described later has been developed to solve the above-described problems involved in such an electronic-zoom function. In accordance with the second embodiment, there is provided means for varying the size of a distance measuring frame in accordance with an image magnification while an image is being enlarged by the electronic zoom. In such means, particularly while the electronic zoom is in operation (while the image magnification is varying), if enlargement of an image is started with an AF control frame (or distance measuring frame) large, AF control is performed with the large distance measuring frame active, until the image magnification reaches a particular magnification. When the electronic zoom is stopped (the image is fixed at a particular image magnification), the size of the distance measuring frame is set according to the image magnification. Accordingly, it is possible to realize a stable AF operation which causes no unnatural defocusing during AF control while an image is being enlarged.

Figure 5:
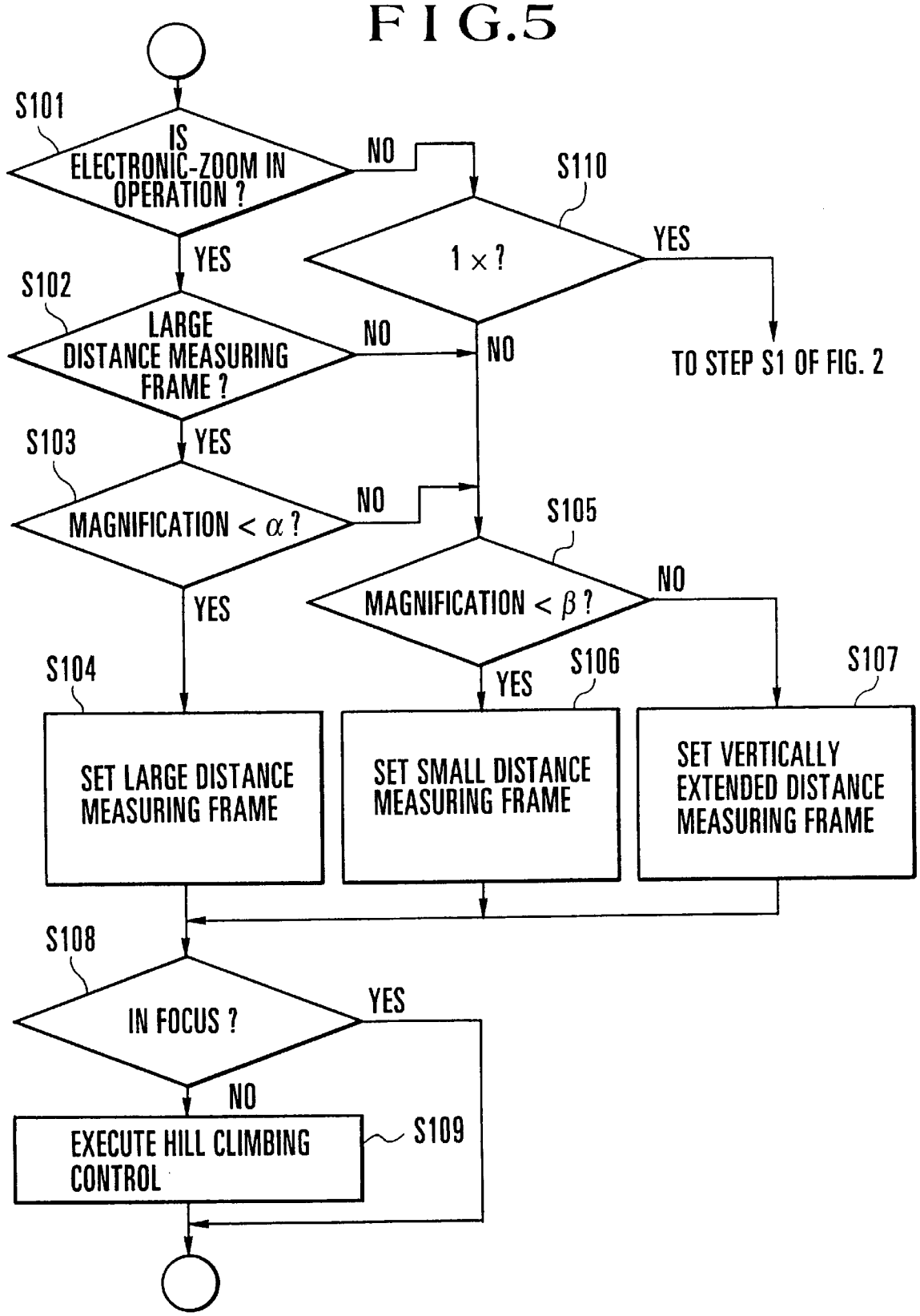
FIG. 5 is a flowchart showing the operation of controlling the distance measuring frames during an electronic-zoom operation in a second embodiment of the present invention.

FIG. 5 is a view aiding in describing the second embodiment, and shows a control flow of the operation of varying the size of the distance measuring frame during electronic zoom, which control flow is added to the flowchart of FIG. 2 of the first embodiment described above. The control flow is processed in the lens controlling microcomputer 118, and is executed during the operation of the electronic zoom. Incidentally, in the following description, it is assumed that the magnification of the electronic zoom is up to 2 times by way of example.

Step S101 executes the processing of determining whether the electronic zoom is in operation. Specifically, it is determined whether the image magnification of the electronic zoom is varying, on the basis of the states of the zoom switches 136 and 137 and the electronic-zoom on/off switch 140, the position of the variator lens 102 and electronic-zoom operation information obtained through communication with the electronic-zoom microcomputer 113.

If it is determined that the electronic zoom is in operation, it is confirmed in Step S102 whether the current distance measuring frame is a large distance measuring frame. If the AF control frame is a large distance measuring frame, it is determined in Step S103 whether the enlargement ratio of the electronic zoom is smaller than a particular magnification α. If the answer is YES, the distance measuring frame is set to a large distance measuring frame.

If the decision result in Step S103 is No, it is determined in Step S105 whether the magnification of the electronic zoom is smaller than a particular magnification β (where 1<α<β<2). If the answer in Step S105 is YES, the distance measuring frame is set to a small distance measuring frame in Step S106. If the answer in Step S105 is NO, the distance measuring frame is set to a vertically extended frame (a distance measuring frame C in FIG. 3). The reason why the distance measuring frame is set to the vertically extended frame is as follows. As described previously in connection with the first embodiment, the AF sharpness signal obtained from the picture of an image enlarged by the electronic zoom is obtained in the form of an intermittent signal enlarged in the vertical direction of the distance measuring frame. As a result, if the image magnification at which a subject is to be photographed is large, the subject is often photographed as an enlarged image of low contrast, and also the image of the subject tends to easily move by the influence of a camera vibration such as a camera shake. For this reason, to maintain the stability of AF, it is preferable to employ as large a distance measuring frame as possible. The reason why no large distance measuring frame is set in Step S107 is that the signal employed as the AF control signal (or AF sharpness signal) is a video signal which is not enlarged in the horizontal direction of the distance measuring frame. If the large distance measuring frame is set, a subject outside of the picture of the enlarged image will occasionally be brought into focus.

If it is determined in Step S102 that the distance measuring frame which is currently used during the electronic-zoom operation is not the large distance measuring frame, the processing starting at Step S105 is executed. In this case, as described above, the distance measuring frame is set to the small distance measuring frame or the vertically extended distance measuring frame. Then, it is determined in Step S108 whether the lens system is in focus. If the lens system is in focus, the present processing is brought to an end, whereas if the lens system is out of focus, the process proceeds to Step S109, in which hill climbing control is performed.

If it is determined in Step S101 that no electronic zoom is in operation, the current image magnification is confirmed in Step S110. In the case of a magnification of 1×, it is determined that the current image is not an enlarged image, and the process proceeds to Step S1 of the flowchart shown in FIG. 2 and normal AF control is performed. If it is determined in Step S110 that the image magnification is greater than 1×, the process proceeds to Step S105. The distance measuring frame is set to the small or vertically extended distance measuring frame in accordance with the current image magnification, and AF control is performed.

As described above, in accordance with the magnitude of the image magnification, the size of the distance measuring frame is set in the following manner:

1×<image magnification<β→small distance measuring frame; and

β<image magnification<2×→vertically extended distance measuring frame.

However, if the following conditions (a), (b) and (c) are satisfied, the large distance measuring frame remains selected:

(a) image magnification is varying (electronic zoom is in operation);

(b) 1×<image magnification<α; and (c) AF control before electronic-zoom operation (image magnification=1×) is performed with the large distance measuring frame selected.

The reason why the large distance measuring frame remains selected is as follows. Since the image magnification of the electronic zoom is varying, if α is made approximately 1×, the size of the distance measuring frame becomes slightly larger than the picture of an image to be photographed, but it is possible to nearly completely prevent occurrence of the problem that the camera is focused on a subject outside of the picture and the image within the picture is displayed as a defocused image. In contrast, if the distance measuring frame does not remain selected and is made small according to the image magnification, the subject may be lost sight of. This will induce unnatural defocusing.

As is apparent from the above description, in accordance with the second embodiment, there is provided means for selecting the size of a distance measuring frame suited to a zoom operation such as optical zoom or electronic zoom, according to the state of an AF control distance measuring frame set before the zoom operation. Accordingly, it is possible to realize an optical-zoom or electronic-zoom operation which can maintain an in-focus state even during a zoom operation without losing sight of a subject which has been recognized before the zoom operation.

Also, there is provided means for varying the size of an AF control distance measuring frame according to the image magnification of an image which is enlarged by electronic zoom. Accordingly, it is possible to prevent occurrence of the problem that a subject outside of the picture of an enlarged image is brought into focus and a subject within the picture is greatly defocused. Further, it is possible to prevent occurrence of the problem that if the image magnification at which a subject is to be photographed is large, the subject is photographed as an enlarged image of low contrast or the image of the subject vehemently moves into and out of the picture by the influence of a camera vibration such as a camera shake. Accordingly, it is possible to prevent degradation of the stability of AF, whereby a consistently stable, highly accurate AF operation can be performed.

Third Embodiment

A third embodiment of the present invention will be described below. The third embodiment relates to a video camera provided with both optical zooming means and electronic zooming means and is intended to realize optimum control of focusing adjusting means according to the characteristics of the respective zooming means.

The recent development of video apparatuses, such as video cameras and electronic cameras, is remarkable, and a number of standard functions, such as an automatic focus adjusting (AF) function, are incorporated into a single video apparatus to improve the function and operability thereof.

In the field of automatic focus adjusting devices, the following type of system has become increasingly popular: the sharpness of a picture is detected from a video signal obtained through photoelectric conversion of a subject image by an image pickup device or the like, and the position of a focusing lens is controlled so that the sharpness becomes a maximum, thereby performing focus adjustment.

In general, to evaluate the sharpness signal, either of the following signal strengths is employed: the strength of a high-frequency component of a video signal extracted by a band-pass filter (BPF) or the detection strength of a defocusing width (the width of the edge portion of a subject image) contained in a video signal extracted by a differentiating circuit or the like.

In a case where an ordinary subject image is photographed, if a focusing lens is out of focus, the level of the high-frequency component of the subject image is small and the defocusing width is large, but as the focusing lens approaches an in-focus point, the level of the high-frequency component becomes larger and the defocusing width becomes smaller. If the focusing lens completely reaches the in-focus point, the high-frequency component and the defocusing width take maximum and minimum values, respectively. Accordingly, if the aforesaid sharpness is low, the focusing lens is driven at as high a speed as possible in the direction in which the sharpness becomes higher, and as the sharpness becomes higher, the driving speed of the focusing lens is made lower so that the focusing lens stops on "the top of a hill". This method of controlling the focusing lens is generally called a hill climbing autofocus system (hill climbing AF). Particularly in a video camera for photographing a moving image, such an automatic focus adjusting device is adopted so that its operability is remarkably improved. Accordingly, in recent years, the aforesaid automatic focus adjusting device has become an essential function.

Also, cameras having a so-called electronic-zoom function for electronically enlarging a photographic image have recently become popular. Such a camera can realize higher-magnification zooming by combining the electronic-zoom function and an optical-zoom function, whereby it is possible to cope with various photographic conditions.

However, if AF control is performed when the above-described electronic zoom is in operation, signal noise due to a camera shake or the like increases by the influence of a high magnification provided by the electronic zoom. If the magnification is enlarged by the optical zoom, a depth of field becomes shallow.

For this reason, if conventional AF control is executed without modification, a number of problems occur. For example, the direction in which the focusing lens is to be driven is erroneously determined by the influence of a noise component contained in a signal, with the result that an AF operation often comes to a stop with a video image defocused. Also, since the depth of field becomes shallow, a video image is placed in a defocused state for a long time during zooming, with the result that a photographer will feel that a long time is taken until the camera is brought into focus.

Further, while an image is being enlarged by the electronic zoom, the amount of variation of a sharpness signal becomes far larger and the possibility of occurrence of the aforesaid problems becomes higher.

The third embodiment has been made to solve the above-described problems, and is intended to provide an arrangement which comprises image pickup means for photoelectrically converting an optical image focused on its image pickup surface into a video signal, focus adjusting means for focusing the optical image on the image pickup surface, electronic magnification varying means for varying an image magnification by signal processing, and control means for controlling the focus adjusting means in manners which differ between a state wherein the image magnification is varied by the electronic magnification varying means and a state wherein the image magnification is not varied by the electronic magnification varying means.

In the above-described arrangement, it is possible to optimally control the parameters of AF control, according to the state of the electronic zoom, such as whether the current video image is located in an electronic-zoom area, the magnification of the electronic zoom, or whether the electronic zoom is currently in operation. Accordingly, it is possible to perform an AF operation stably and accurately during an electronic-zoom operation.

A video camera according to the third embodiment will be described below with reference to FIGS. 6 through 14. In the following description, reference will first be made to the circuit construction of the third embodiment, the basic operation of the electronic zoom and the basic operation of AF, and then to a control operation which is a feature of the third embodiment.

Figure 6:
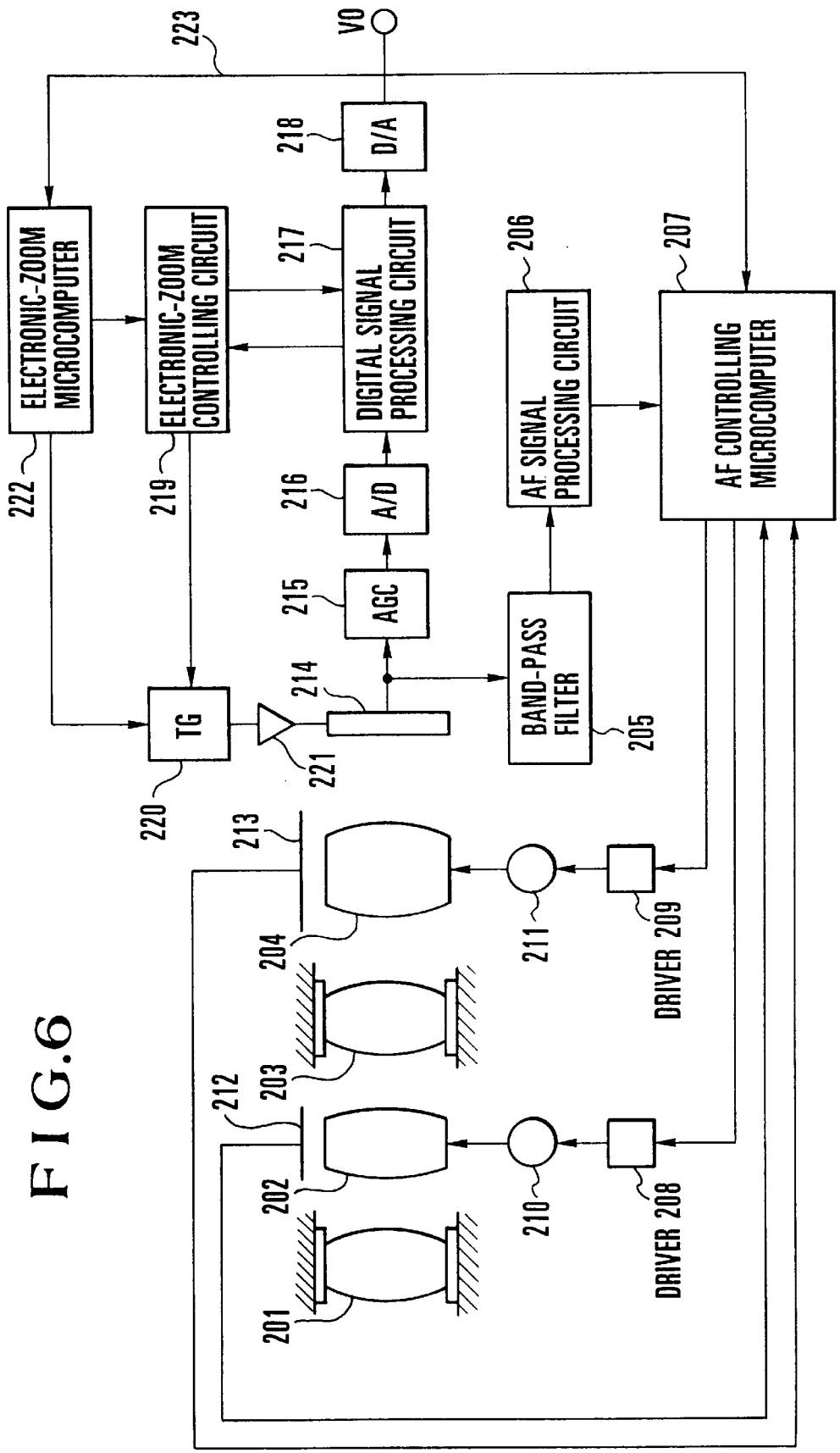
FIG. 6 is a block diagram schematically showing the arrangement of each of third to sixth embodiments of a video camera apparatus according to the present invention.

FIG. 6 is a block diagram showing the third embodiment. The arrangement shown in FIG. 6 includes lens groups 201 to 204. The lens groups 201 and 203 are fixed lens groups, respectively, and the lens group 202 is a variator lens group (hereinafter referred to as the "variator lens"). The lens group 204 is a lens group for focus adjustment and for correcting a focal plane during magnification variation (hereinafter referred to as the "focusing lens").

The arrangement shown in FIG. 6 also includes blocks 214 to 222 for carrying out the electronic zoom. The arrangement of the blocks 214 to 222 will be described later. The shown arrangement also includes the image pickup device 214, the AGC circuit 215, an A/D converter 216 for converting an image pickup signal outputted from the AGC circuit 215 into a digital signal, a digital signal processing circuit 217, a D/A converter 218, an electronic-zoom controlling circuit 219, a timing generator (hereinafter referred to as "TG") 220 for outputting a driving pulse to a driver 221 for the image pickup device 214 in response to an output from the electronic-zoom controlling circuit 219, the driver 221 for actually driving the image pickup device 214 in accordance with an output from the TG 220, and an electronic-zoom controlling microcomputer 222 for controlling the entire electronic-zoom mechanism.

During an electronic-zoom operation, the electronic-zoom controlling microcomputer 222 outputs magnification information to both the TG 220 and the electronic-zoom controlling circuit 219. The electronic-zoom controlling circuit 219 outputs a gate signal to the TG 220 in accordance with the magnification information.

The TG 220 controls the vertical timing of the image pickup device 214 via the driver 221. Under the control of the TG 220, in accordance with the magnification information, it is determined which scanning lines are to be extracted, and dummy signals each containing no substantial signal are used to interpolate between the scanning lines extracted in accordance with the gate signal, thereby adding together the number of the dummy signal lines and the number of the extracted scanning lines to enlarge a picked-up image in the vertical direction thereof.

On the other hand, the electronic-zoom controlling circuit 219 which has received video signal information from the digital signal processing circuit 217 determines horizontal extraction timing on the basis of the magnification information supplied from the microcomputer 222, and outputs the horizontal extraction timing as a gate signal to the digital signal processing circuit 217. The digital signal processing circuit 217 performs horizontal enlargement in accordance with the gate signal and outputs the video signal indicative of the horizontally enlarged image to the D/A converter 218.

In the above-described manner, the electronic-zoom controlling microcomputer 222 executes a 2× electronic-zoom operation by outputting the magnification information to both the TG 220 and the electronic-zoom controlling circuit 219 while temporally varying the magnification information, for example, from 1× to 2×.

By utilizing the aforesaid electronic-zoom function, it is possible to effect high-magnification zooming which cannot be achieved by an analog circuit.

An AF control system will be described below. The AF control system includes a filter 205 for extracting a high-frequency signal component for use in AF control from a video signal outputted from the image pickup device 214, an AF signal processing circuit 206 for producing a sharpness signal required for performing AF processing, and an AF controlling microcomputer 207 for performing AF control by using an output from the AF signal processing circuit 206.

The AF control system also includes drivers 208 and 209 for driving a variator lens driving motor 210 and a focusing lens driving motor 211, the variator lens driving motor 210, the focusing lens driving motor 211, a zoom encoder 212 for detecting the position of the variator lens 202, and a focus encoder 213 for detecting the position of the focusing lens 204. The outputs of the respective encoders 212 and 213 are supplied to the AF controlling microcomputer 207, and the respective positions of the variator lens 202 and the focusing lens 204 are monitored at all times.

Information indicative of the state of the electronic zoom is transmitted over a signal line 223 from the electronic-zoom microcomputer 222 for controlling the electronic zoom to the AF controlling microcomputer 207. On the basis of this information, the AF controlling microcomputer 207 detects the current state of the electronic zoom.

Figure 11:
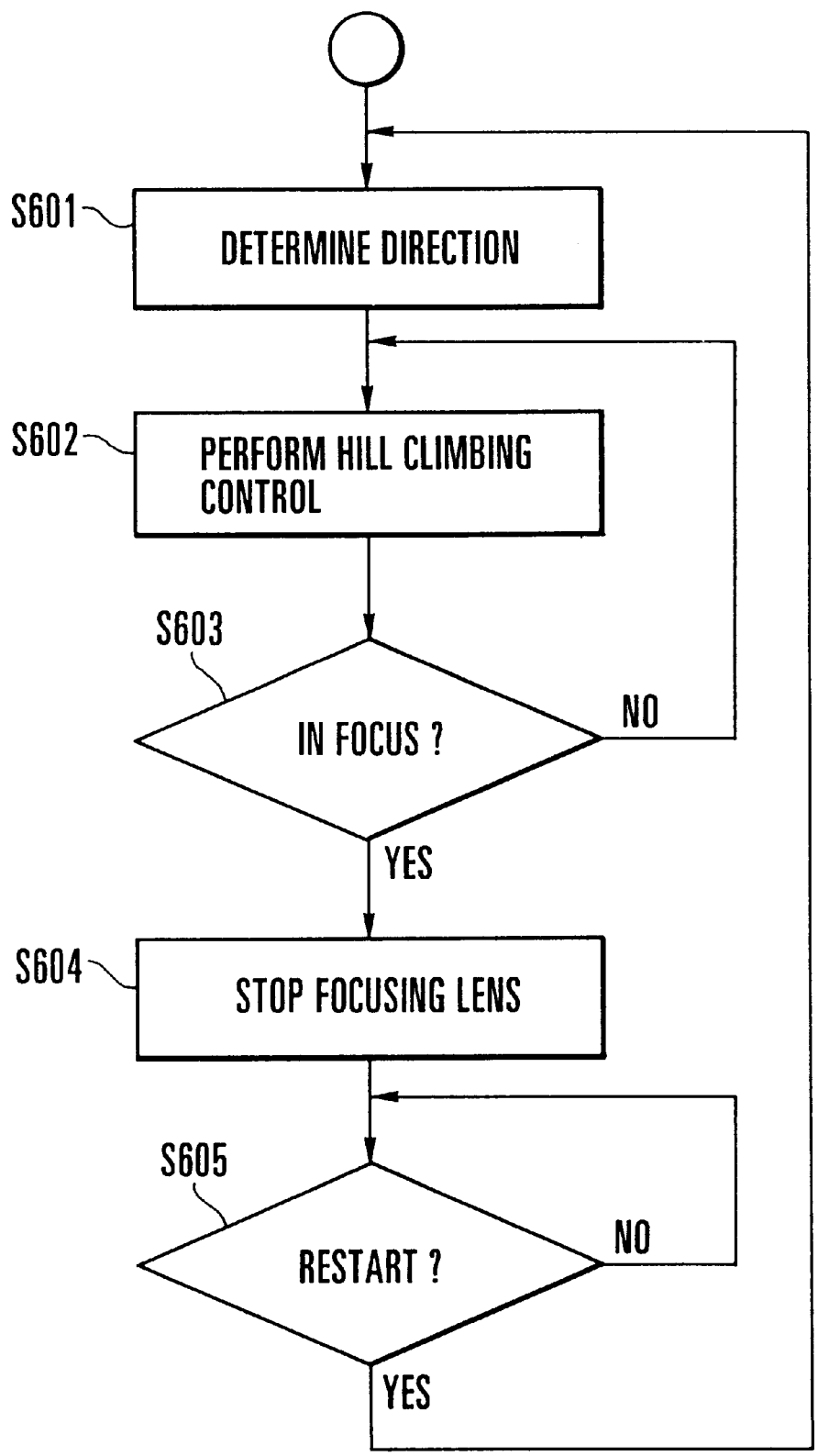
FIG. 11 is a flowchart aiding in describing the basic operation of an AF system.

An automatic focus adjusting method will be described below. The basic operation of the automatic focus adjusting method is shown in the flowchart of FIG. 11.

If control is started with the focusing lens 204 greatly defocused, it is first determined in Step S601 in which direction the focusing lens 204 is to be driven. A general method for making such a decision is to move the focusing lens 204 back and forth along the optical axis from its current position by a predetermined width A and find the direction in which the peak of a sharpness signal is present.

Figure 12:
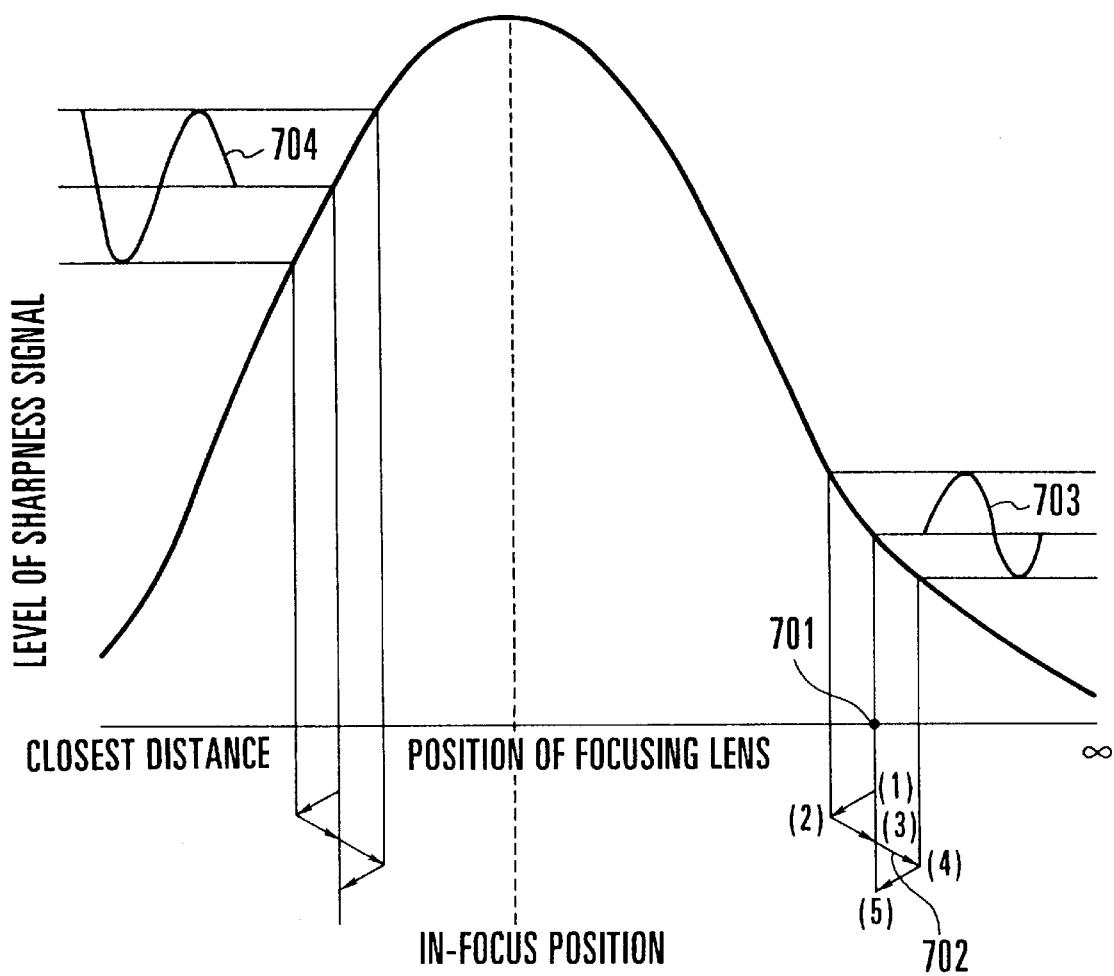
FIG. 12 is a characteristic chart aiding in describing a "wobbling movement" which is carried out during an AF operation, and shows the relationship between the position of a focusing lens and focus voltage.

Referring to FIG. 12, if the current position of the focusing lens 204 is a position 701 which is away from an in-focus position toward an infinity side, the focusing lens 204 is made to move while drawing a locus 702 which is shown by arrows (1) to (5) (this movement is hereinafter referred to as "wobbling"). During the wobbling, the focusing lens 204 moves toward and away from the in-focus position, and the level of the sharpness signal exhibits a variation such as that shown by a curve 703.

On the other hand, in a case where the focusing lens 204 is present on a closest-distance side with respect to the in-focus position, if the focusing lens 204 performs the wobbling movement similar to that shown by the locus 702, the level of the sharpness signal exhibits a variation such as that shown by a curve 704. By comparing the curves 703 and 704, it is understood that the curves 703 and 704 of the respective sharpness signals are 180 degrees out of phase. In other words, if the focusing lens 204 is made to perform a predetermined wobbling movement and the manner of variation of the level of a sharpness signal at that time is observed, it is possible to determine whether the focusing lens 204 is in near focus or far focus, whereby it is possible to select a direction in which to drive the focusing lens 204.

If the direction in which the in-focus point is present is determined by the above-described direction decision, the flow proceeds to Step S602, in which hill climbing control is executed until the peak position of the sharpness signal is reached. Then, in Step S603, it is determined whether the focusing lens 204 is in focus. One method for detecting an in-focus point, which is adopted in Steps S602 and S603, is to memorize the peak position of the sharpness signal which varies in level, temporarily move the focusing lens 204 beyond the peak position of the sharpness signal, and move the focusing lens 204 back to the detected peak position. specifically, while the focusing lens 204 is being driven in the direction determined on the basis on the wobbling, the level of the sharpness signal is repeatedly held as a peak value, and at the time when the increasing level of the sharpness signal starts to decrease, the focusing lens 204 is reversed, and is made to return to a lens position at which the level of the sharpness signal has reached its maximum.

Figure 13:
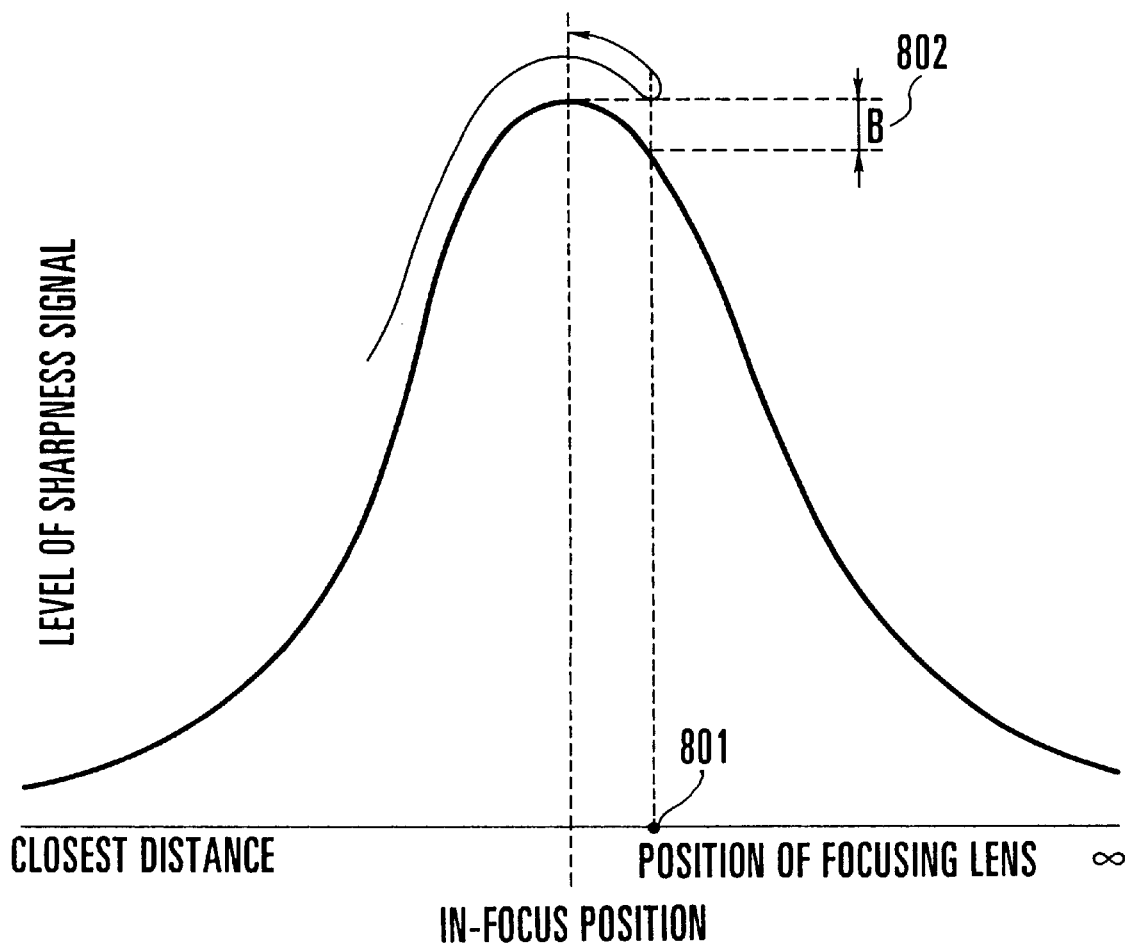
FIG. 13 is a characteristic chart aiding in describing the "amount of overshoot" which occurs during an AF operation, and shows the relationship between the position of the focusing lens and focus voltage.

In this case, to cope with the influence of noise or the like, if the level of the sharpness signal decreases by a particular value, for example, if the focusing lens 204 moves from the in-focus position shown in FIG. 13 down to a position corresponding to a point 801 and the level of the sharpness signal decreases from its held peak value by the value B indicated by 802, the focusing lens 204 is reversed. The value B indicated by 802 is hereinafter referred to as "the amount of overshoot of the focusing lens 204". Detection of an in-focus state is performed in the above-described manner.

Referring back to FIG. 11, if it is determined in Step S603 that the focusing lens 204 is out of focus, the hill climbing control is repeated until an in-focus state is obtained. If it is determined in Step S603 that the focusing lens 204 is in focus, the focusing lens 204 is made to stop in Step S604, and the flow proceeds to Step S605. In Step S605, it is determined whether driving of the focusing lens 204 is to be restarted. The focusing lens 204 is stopped until it is determined that driving of the focusing lens 204 be to be restarted. To determine whether driving of the focusing lens 204 is to be restarted, it is possible to adopt a method of restarting the driving of the focusing lens 204 when the magnitude of the difference between the level of the sharpness signal obtained at an in-focus position and the level of the current sharpness signal exceeds a particular threshold.

Figure 14:
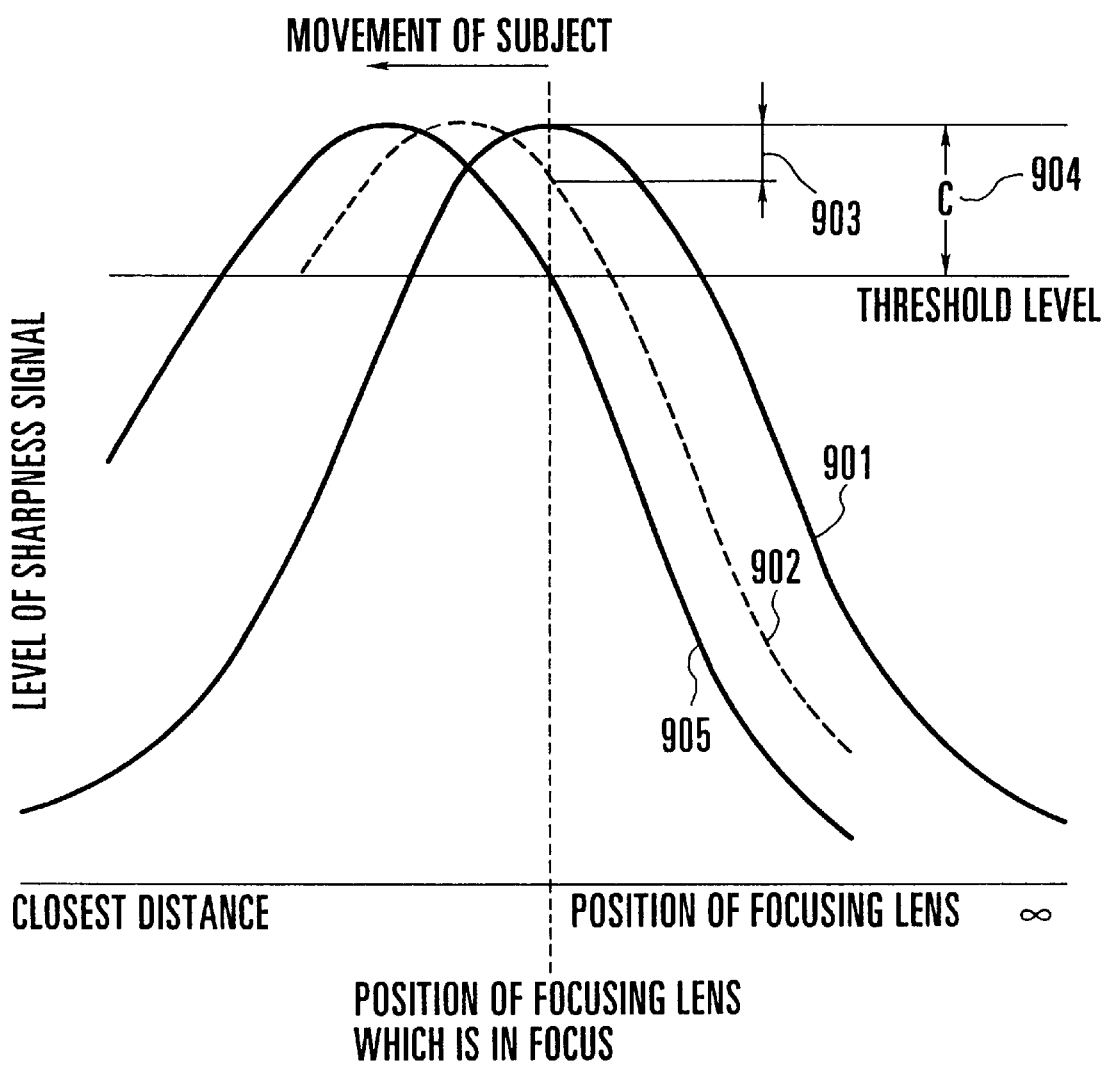
FIG. 14 is a characteristic chart aiding in describing "restarting" which is carried out during an AF operation, and shows the relationship between the position of the focusing lens and focus voltage.

FIG. 14 shows a variation in focus voltage which occurs when a subject moves. If the subject moves with respect to a hill 901 formed by a sharpness signal, the hill of the focus voltage varies as shown by 902. The magnitude of the sharpness signal at the position where the focusing lens 204 is located at that time varies by the magnitude indicated by 903.

The threshold C indicated by 904 is set as the aforesaid particular threshold on the basis of which it is determined whether the driving of the focusing lens 204 is to be restarted. The threshold C is determined by the level of the sharpness signal used in the previous focusing operation, and is given by:

$$C = X - X \times N \div 100 \quad (1)$$

where X represents the level of the previous sharpness signal.

In Expression (1), the value N is a predetermined restarting constant which indicates that the greater the value N, the more strongly the focusing lens 204 resists being moved. The decision as to the restarting is made on the basis of the threshold which is set in this manner.

If it is determined in S605 of FIG. 11 that the driving of the focusing lens 204 needs to be restarted, the flow returns to Step S601, in which the aforesaid direction decision is made again. By repeating the above-described flow, automatic focusing adjustment is effected so that an in-focus state is maintained at all times.

As is known, recent video cameras have various additional functions, such as digital image stabilization and electronic zoom, owing to digital ICs incorporated in their AF signal processing circuits.

The third embodiment relates to such a video camera having multiple functions utilizing digital signal processing, and its object is to provide an arrangement capable of assuring high AF performance at all times even if a function other than an AF function, such as an electronic-zoom function or an electronic image stabilization function, is activated and photographic conditions variously change. An operation which is a feature of the present embodiment will be described below.

Figure 7:
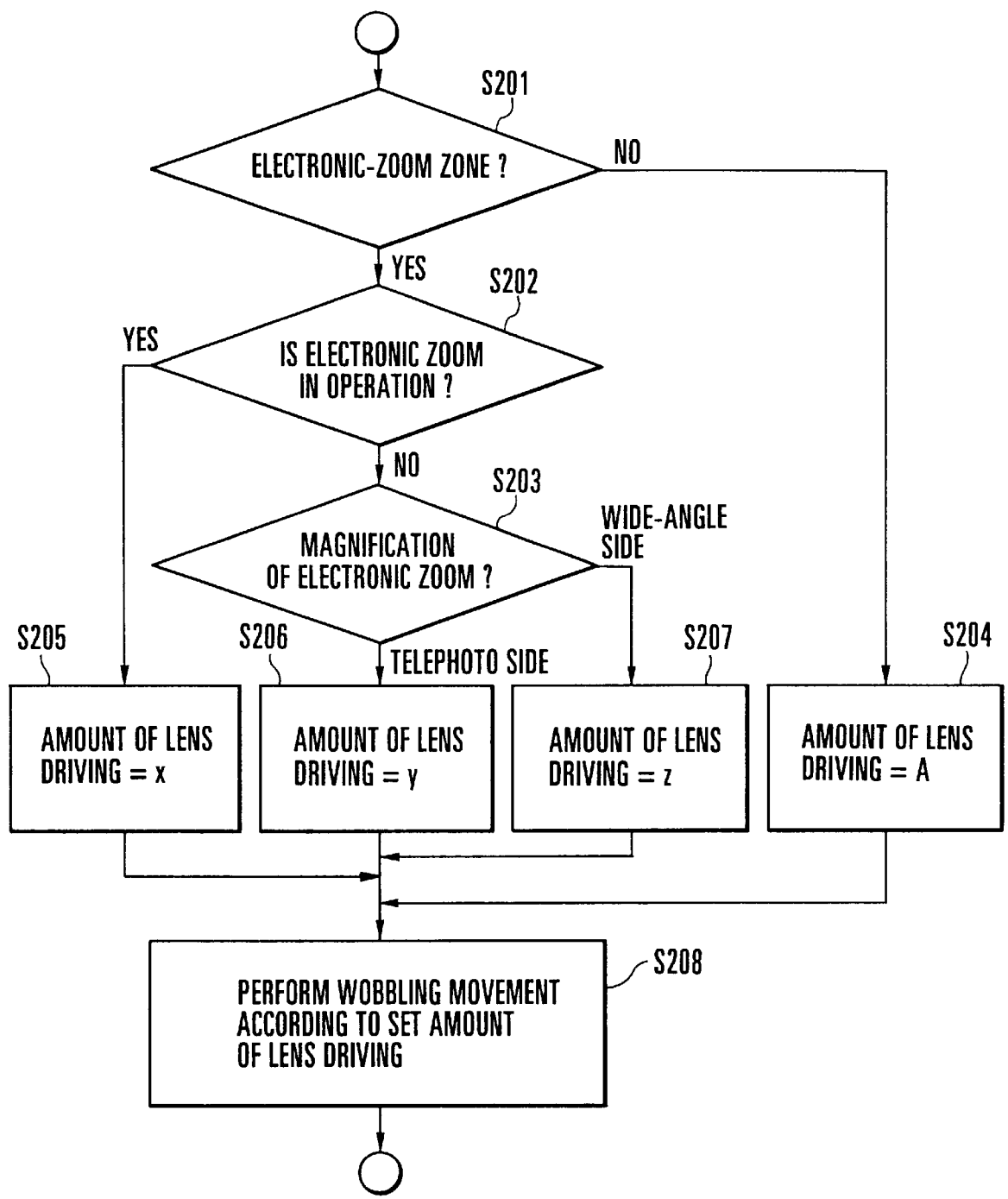
FIG. 7 is a flowchart showing the third embodiment of the present invention.

FIG. 7 is a flowchart showing a processing program provided in the AF controlling microcomputer 207 according to the third embodiment of the present invention which is intended to optimize the operation of the video camera system having both of the aforesaid electronic-zoom function and the AF function, by varying the operation of the AF function when the electronic-zoom function is in operation.

In the following description, reference will be made to a modified part of the electronic-zoom operation associated with the wobbling movement under the aforesaid AF control.

When the processing shown in FIG. 7 is started, it is determined in Step S201 whether an electronic-zoom operation is currently being performed, i.e., whether the current zooming zone is an electronic-zoom zone. If the current zooming zone is not an electronic-zoom zone, the process proceeds to Step S204, in which an amount of movement, "A", is set as the amount of lens driving for wobbling.

If it is determined in Step S201 that the current zooming zone is an electronic-zoom zone, the process proceeds to Step S202, in which it is determined whether the magnification of the electronic zoom is varying.

If the electronic zoom is in operation, in Step S205, an amount of lens driving, "x", is set as the amount of lens driving for wobbling during an electronic-zoom operation. If the electronic zoom is not in operation, in Step S203, the current magnification of the electronic zoom is checked. If the state of the magnification indicates that the electronic zoom is set to the telephoto side, the process proceeds to Step S206, whereas if the state of the magnification indicates that the electronic zoom is set to the wide-angle side, the process proceeds to Step S207. In Step S206, an amount of lens driving, "y", is set as the amount of lens driving for wobbling on the telephoto side. In Step S207, an amount of lens driving, "z", is set as the amount of lens driving for wobbling on the wide-angle side.

If the amounts of lens driving for wobbling, "x", "y" and "x", which are respectively set in Steps S205, S206 and S207 according to the state of the electronic zoom are compared with the amount of lens driving, "A", which is set for a zone other than the electronic-zoom zone, the relationship between the amounts of lens driving for wobbling, "x", "y" and "x", is given by:

$$x > y > z > A \quad (2)$$

In this setting, account is taken of the magnitude of a noise component. By using the setting shown by Expression (2), it is possible to eliminate the influence of noise due to the electronic zoom during wobbling. On the basis of the amount of lens driving which has been set in any one of Steps S204 to S207, the wobbling operation is actually performed in Step S208.

Accordingly, it is possible to prevent an erroneous direction decision from being performed even in the case of the electronic-zoom zone or while the magnification is varying.

Fourth Embodiment

In the following description, reference will be made to a modified part of the electronic-zoom operation associated with an in-focus point detecting operation under the aforesaid AF control.

Figure 8:
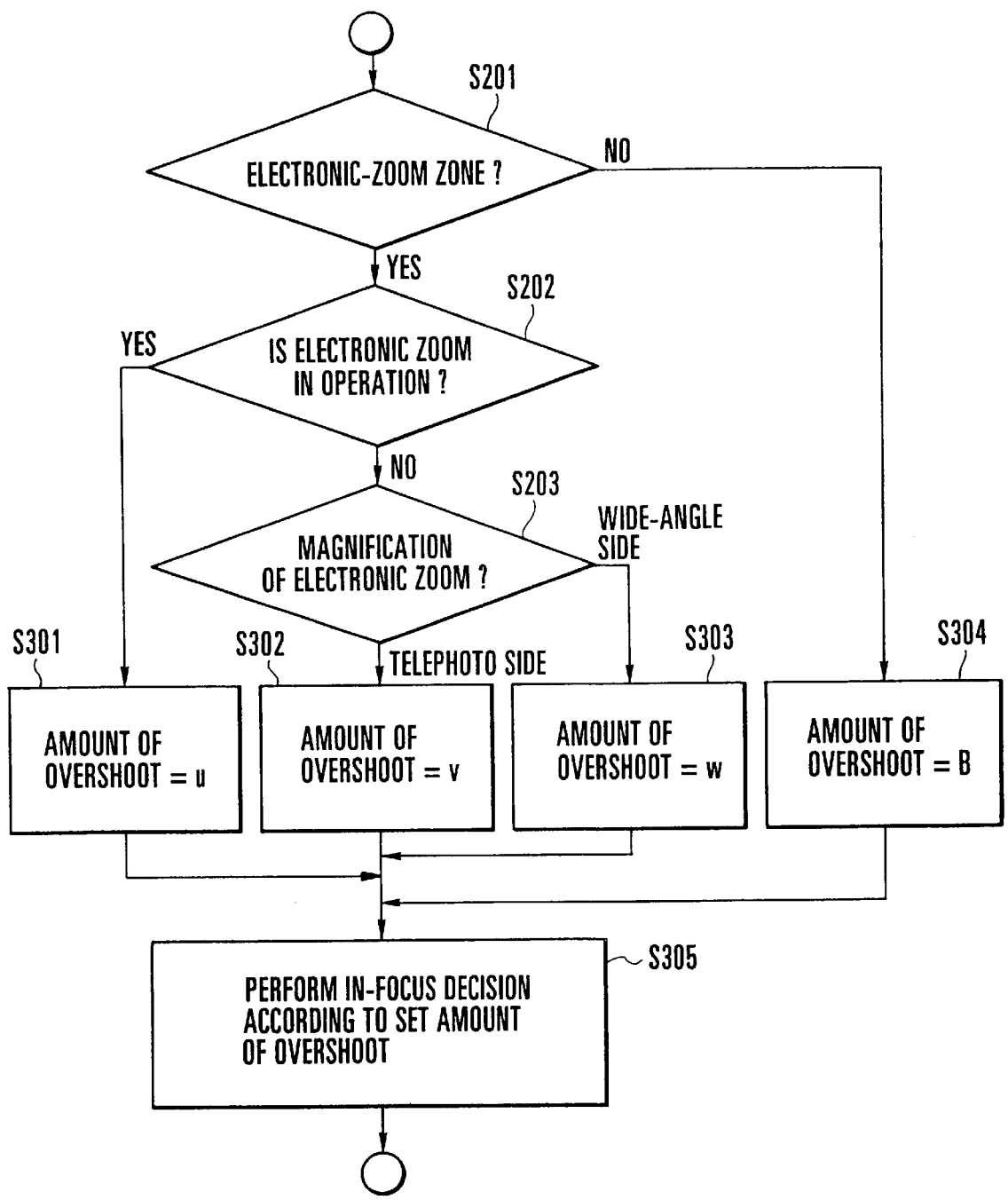
FIG. 8 is a flowchart showing the fourth embodiment of the present invention.

FIG. 8 is a flowchart showing the operation of the fourth embodiment. Referring to FIG. B, in Steps S201 to S203, the state of operation of the electronic zoom is detected as described above in connection with the third embodiment shown in FIG. 7. According to the state of the electronic zoom which is detected in Steps S201 to S203, the process proceeds to any one of Steps S301 to S304 for the purpose of setting the amount of overshoot of the focusing lens 204 according to the state of the electronic zoom (refer to 802 of FIG. 13 for the meaning of the amount of overshoot).

If the electronic zoom is in operation, an amount of overshoot, "u", is set in Step S301. If the magnification of the electronic zoom is set to the telephoto side, an amount of overshoot, "v", is set in Step S302. If the magnification of the electronic zoom is set to the wide-angle side, an amount of overshoot, "w", is set in Step S303. If the current zooming zone is not in the electronic-zoom zone, an amount of overshoot, "B", is set in Step S304.

The relationship between the amounts of overshoot, "u", "v" and "z" set in Steps S301 to S303 and the amount of overshoot, "B", set in Step S304 is given by:

$$u>v>w>B \quad (3)$$

This setting is based on the same method as the setting employed in the third embodiment. By using this setting, it is possible to eliminate the influence of noise due to the electronic zoom during focus adjustment and to reliably focus on a subject without misjudging an in-focus point due to noise. Subsequently, in Step S305, a focus detecting operation for the focusing lens is performed according to the set amount of overshoot.

Accordingly, it is possible to prevent the AF control from coming to a stop with an image defocused, even in the case of the electronic-zoom zone or while the magnification of the electronic zoom is varying.

Fifth Embodiment

In the following description, reference will be made to a modified part of the electronic-zoom operation associated with a restarting decision operation under the aforesaid AF control.

Figure 9:
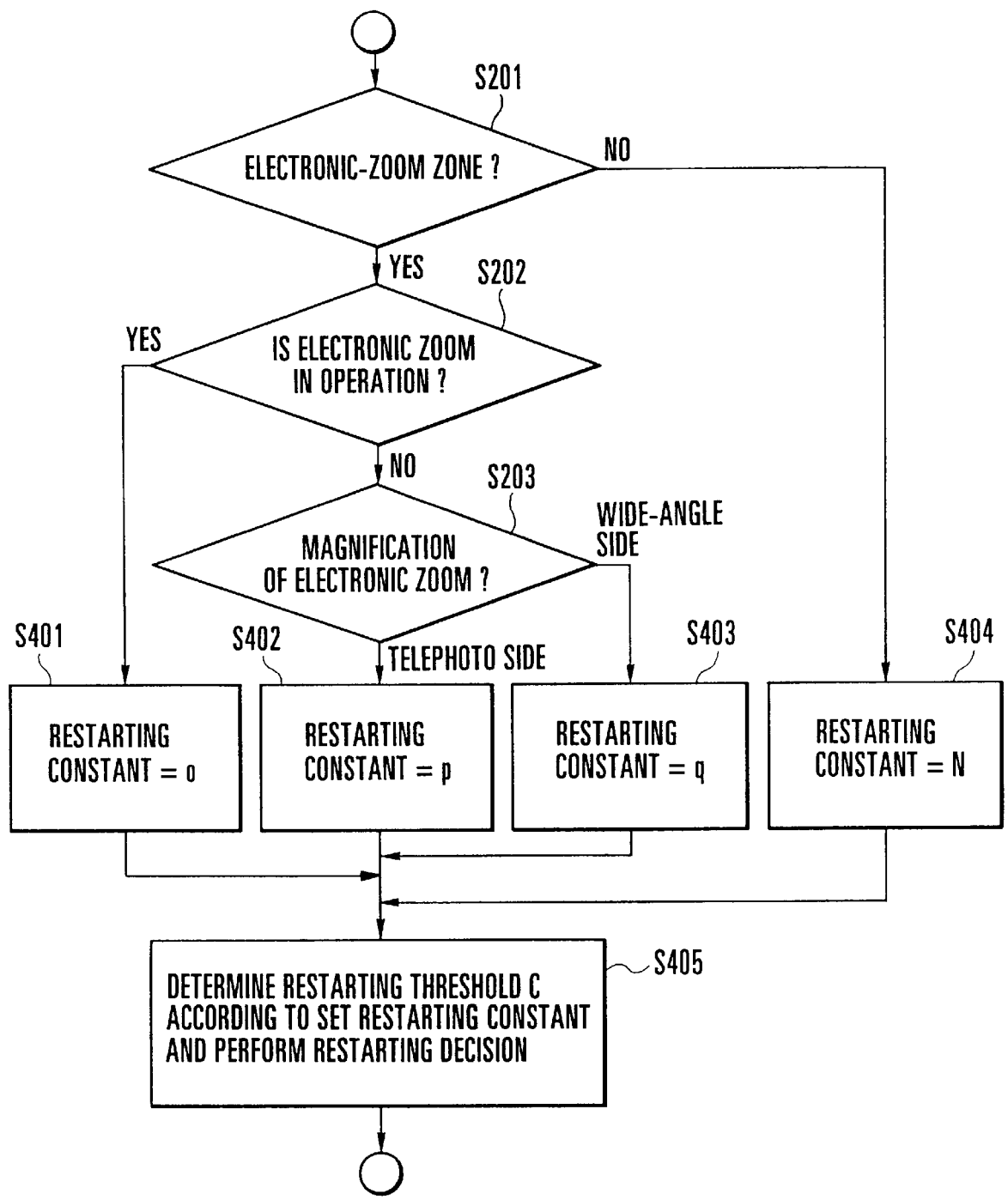
FIG. 9 is a flowchart showing the fifth embodiment of the present invention.

FIG. 9 is a flowchart showing the operation of the fifth embodiment. In FIG. 9, the processing of Steps S201 to S203 is identical to that described above in connection with the third embodiment shown in FIG. 7 or the fourth embodiment shown in FIG. 8, and in Steps S201 to S203, the current state of the electronic zoom is detected. According to the detected state, the process proceeds to any one of Steps S401 to S404 for the purpose of setting a restarting constant o, p, q or N. The restarting constants o, p and q correspond to the respective states of the electronic zoom detected in Steps S201 to S203, while the restarting constant N correspond to the case where the current zooming zone is not the electronic-zoom zone. The relationship between o, p, q and N is given by:

$$p<q<N<o \quad (4)$$

As described previously, the greater the restarting constant, the more strongly the focusing lens 204 resists being moved. The reason why Expression (4) is set so that the focusing lens 204 can resist being moved is to prevent the problem that while the electronic zoom is being driven, the level of the sharpness signal tends to decrease and the focusing lens 204 is defocused during an electronic-zoom operation even if the focusing lens 204 is in focus before the electronic zoom is driven. If the electronic zoom is not being driven when the current zooming zone is the electronic-zoom zone, even a slightly defocused state is conspicuous because the depth of field is shallow compared to any zooming zone other than the electronic-zoom zone. Accordingly, if the electronic zoom is not being driven when the current zooming zone is the electronic-zoom zone, the restarting constant is made small so that the driving of the focusing lens 204 can be easily restarted. Then, in Step S405, it is determined whether the driving of the focusing lens 204 is to be restarted in accordance with the restarting constant which has been set in any one of Steps S401 to S404.

Accordingly, it is possible to prevent the AF control from coming to a stop with an image defocused when the electronic-zoom zone is active, and it is also possible to prevent the AF control from fluctuating while the electronic zoom is being driven.

Sixth Embodiment

Figure 10:
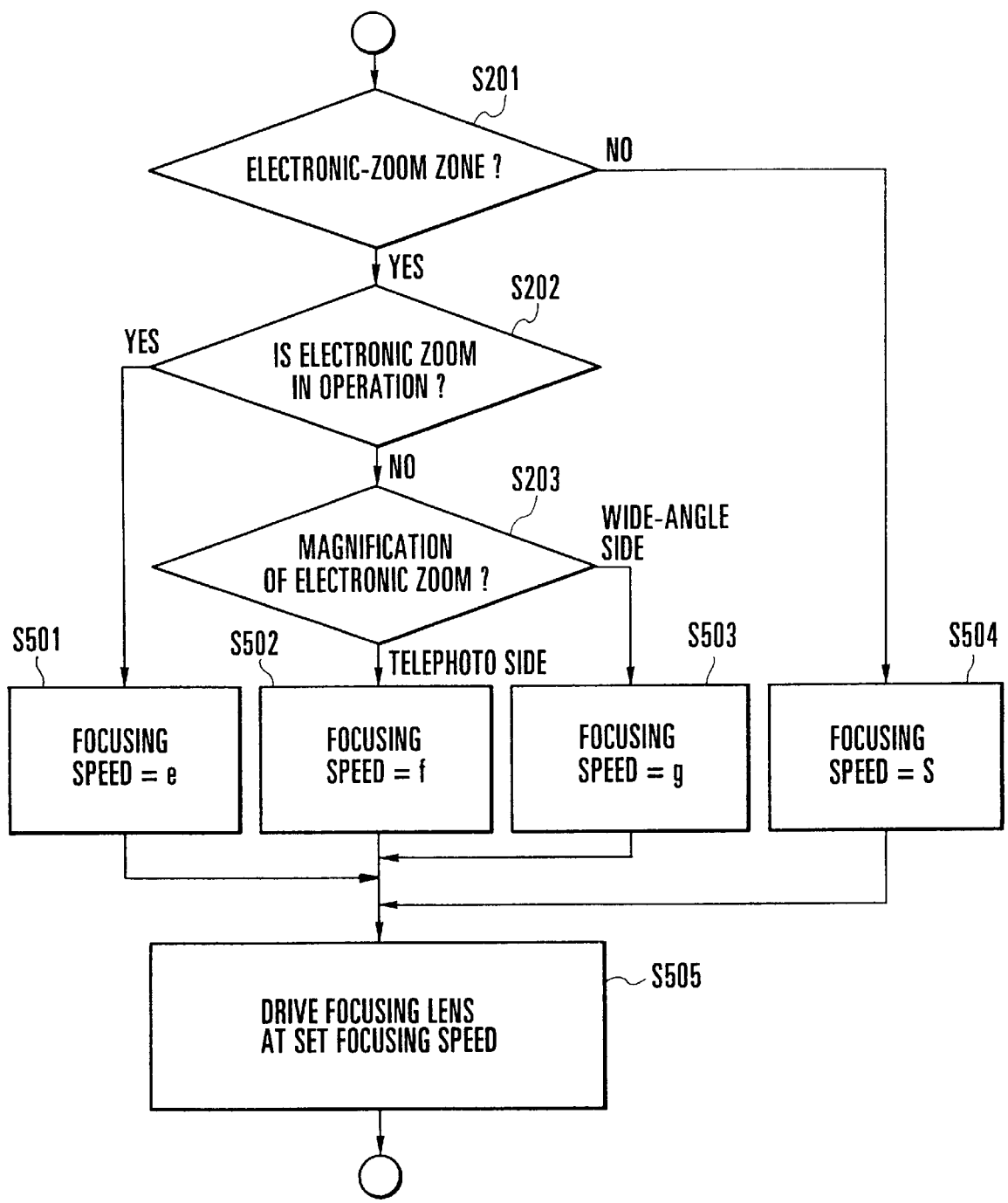
FIG. 10 is a flowchart showing the sixth embodiment of the present invention.

The sixth embodiment is intended to optimize the driving speed of the focusing lens 204 during an electronic-zoom operation. FIG. 10 is a flowchart showing a method for selecting a desired driving speed during an electronic-zoom operation.

In FIG. 10, the processing of Steps S201 to S203 is identical to that described above with reference to the flowchart shown in FIG. 7, and in Steps S201 to S203, the current state of the electronic zoom is detected. According to the detected state, the process proceeds to any one of Steps S501 to S504 for the purpose of setting a focusing lens driving speed e, f, g or S. The focusing lens driving speeds e, f and g correspond to the respective states of the electronic zoom detected in Steps S501 to S503, while the focusing lens driving speed S corresponds to the case where the current zooming zone is not the electronic-zoom zone. The relationship between e, f, g and S is given by:

$$e>f>g>S \quad (5)$$

Particularly if the electronic zoom is driven when the focusing lens 204 is out of focus, the degree of defocusing apparently increases owing to a magnification variation provided by the electronic zoom. For this reason, the focusing lens driving speed is made faster so that a subject can be quickly brought into focus.

Also, when the zooming zone is the electronic-zoom zone, the depth of field is shallow and a defocused state is conspicuous owing to a high magnification provided by the electronic zoom. However, by making the focusing lens driving speed faster, it is possible to shorten the period of time during which the focusing lens 204 is out of focus.

Then, in Step S505, the focusing lens 204 is driven at the focusing lens driving speed which has been set in any one of Steps S501 to S504.

Accordingly, when the electronic-zoom zone is active as well as when the electronic zoom is in operation, it is possible to effect smooth and stable AF control by varying the driving speed of the focusing lens 204.

Although the above description of the sixth embodiment has referred to the focus adjustment control utilizing sharpness, the present embodiment can of course be applied to any kind of camera system utilizing an image pickup device, for example, even a camera system having an infrared type of focus adjustment control.

As is apparent from the above description, in accordance with each of the third to sixth embodiments, in a camera having an electronic-zoom function, when AF control is in the electronic-zoom zone or when the electronic zoom is in operation, by varying parameters for focus adjustment, it is possible to eliminate various problems such as the influence of noise by a high magnification provided by the electronic zoom. Accordingly, it is possible to effect a smooth focus adjusting operation at all times.

Seventh Embodiment

A seventh embodiment of the present invention will be described below.

The seventh embodiment is intended to provide a automatic focus adjusting device capable of effecting a high-precision automatic focus adjusting operation free of malfunction by optimizing the manner of making a selection from distance measuring areas which are set within a picture.

In accordance with the seventh embodiment, there is provided an arrangement capable of setting distance measuring areas of different sizes within a picture. In the arrangement, when driving of a focusing lens is to be restarted after an in-focus position is reached, a discrimination is made as to the state of focus relative to each of the distance measuring areas, and on the basis of the result of the discrimination, a suitable distance measuring area is selected.

In another arrangement according to the seventh embodiment, different priorities are assigned to the respective distance measuring areas, and when the driving of the focusing lens is to be restarted, if a distance measuring area used when an in-focus state was obtained is a distance measuring area having a higher priority, this distance measuring area is selected, whereas if a distance measuring area used when an in-focus state was obtained is a distance measuring area having a lower priority, a discrimination is made as to the state of focus relative to each of the distance measuring areas and a suitable distance measuring area is determined.

In another arrangement according to the seventh embodiment, the focusing lens is driven to perform a focus adjusting operation, and if an in-focus state is reached, it is determined whether a subject the distance to which can be measured is present within a distance measuring area having a higher priority. If such a subject is present, the distance measuring area having a higher priority is used to perform automatic focus adjustment.

The present embodiment will be described below in order, and the background thereof will first be referred to.

Automatic focus adjusting systems are grouped into two systems: an active AF system which is arranged to project an infrared ray or the like toward a subject and recognize the distance to the subject by using reflected light and a passive AF system which is arranged to perform focusing so that the level of the high-frequency component of a video signal will reach a peak. In recent years, the latter passive AF system has become popular.

One great advantage of the passive AF system is that, unlike the active AF system, since the passive AF system does not need a light emitting part nor a light receiving part, the passive AF system can be suitably used in a miniaturized camera part.

In the field of video cameras, a so-called television AF system is widely used as this kind of passive AF system. The television AF system is arranged to extract a high-frequency component or the like, the level of which varies according to the state of focus, from an output signal of an image pickup device, detect the sharpness of an image, and drive a focusing lens so that the sharpness becomes a maximum.

The television AF system has the advantage that focus can be detected from the output signal of an image pickup device and no dedicated focus sensor is needed. Another advantage of the television AF system is that since focus is detected from the sharpness of an image, focus detection performance is not limited by, for example, the distance to a subject.

Figure 18:
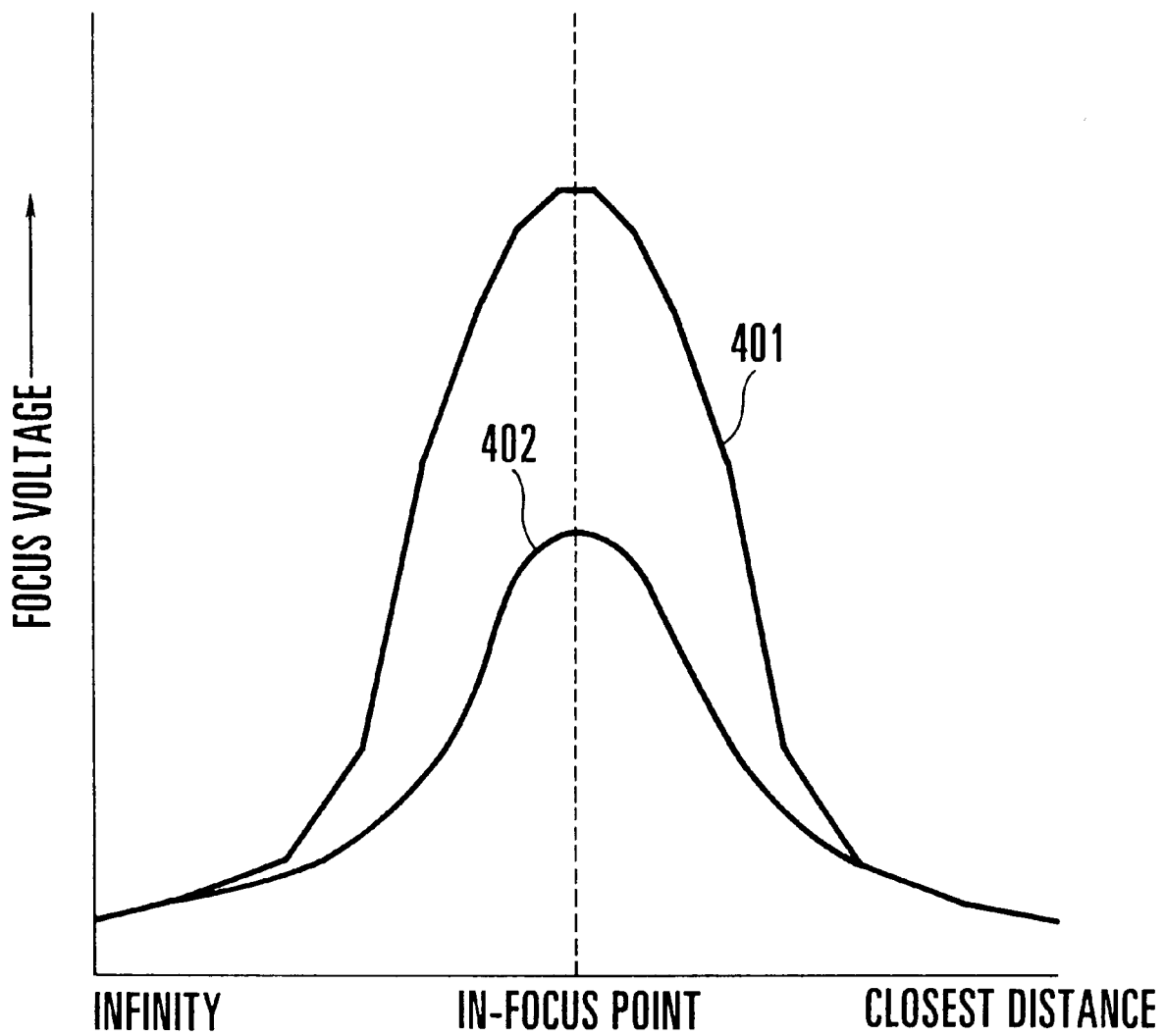
FIG. 18 is a characteristic chart aiding in describing the operation of the automatic focus adjusting device according to the seventh embodiment of the present invention, and shows the relationship between the position of the focusing lens and focus voltage.

In the operation of the television AF system, first, after an image pickup device photoelectrically converts a picked-up image into a video signal and outputs the video signal, only a high-frequency component of the video output signal is extracted by a band-pass filter. The level of the high-frequency component shows a peak when a focusing lens reaches an in-focus position, and as the focusing lens defocuses, the level becomes gradually lower. The level of the high-frequency component is hereinafter referred to as "focus voltage", and characteristic curves 401 and 402 of FIG. 18 represent the manner of a variation of the focus voltage with respect to a movement of the focusing lens.

In video cameras, to extract the high-frequency component of a video signal, it is common practice to extract the level of a high-frequency component contained in a horizontal scanning signal because of its picture scanning system. Accordingly, as a greater number of vertical lines are contained in a picture or as the vertical lines have more definite shades, the focus voltage exhibits a greater peak value. Referring to FIG. 18, the curves 401 and 402 represent that a video image corresponding to the curve 402 contains a small number of vertical lines in a picture (for example, the number of oblique lines is large) or contains vertical lines which have no definite shades, as compared with a video image corresponding to the curve 401. An AF operation is executed by driving the focusing lens so that the focus voltage will reach a peak.

In the case of such a passive AF system, since a focusing operation is performed on the basis of information about the picture of a picked-up image, which part of the picture is to be focused becomes a problem. For example, if each focusing operation is airways performed with the entire picture selected as a focus detecting area, a subject different from a subject aimed at by a photographer is often brought into focus.

Figure 19:
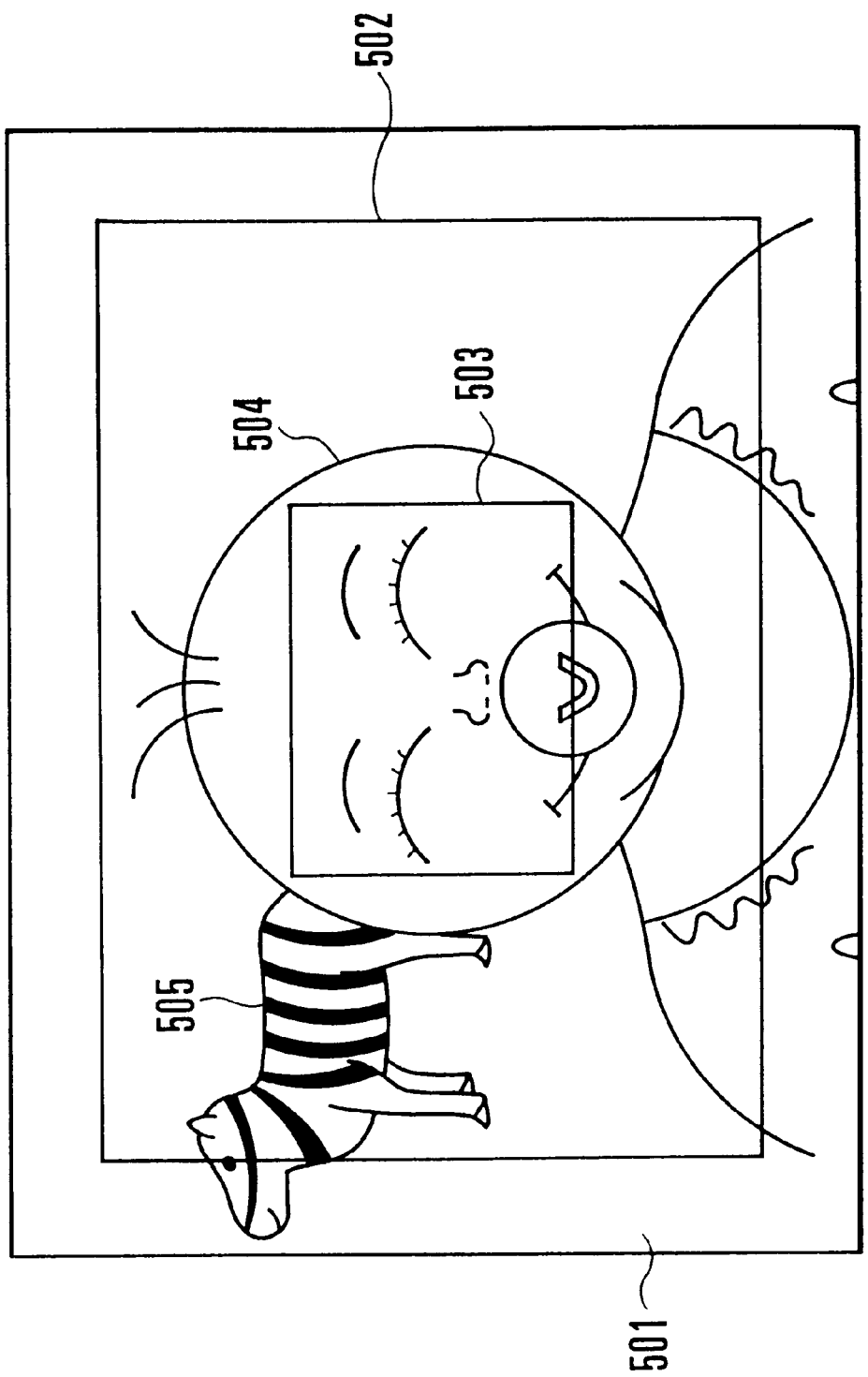
FIG. 19 is a view aiding in describing the relationships between a picture, a subject and distance measuring frames.
Figure 20:
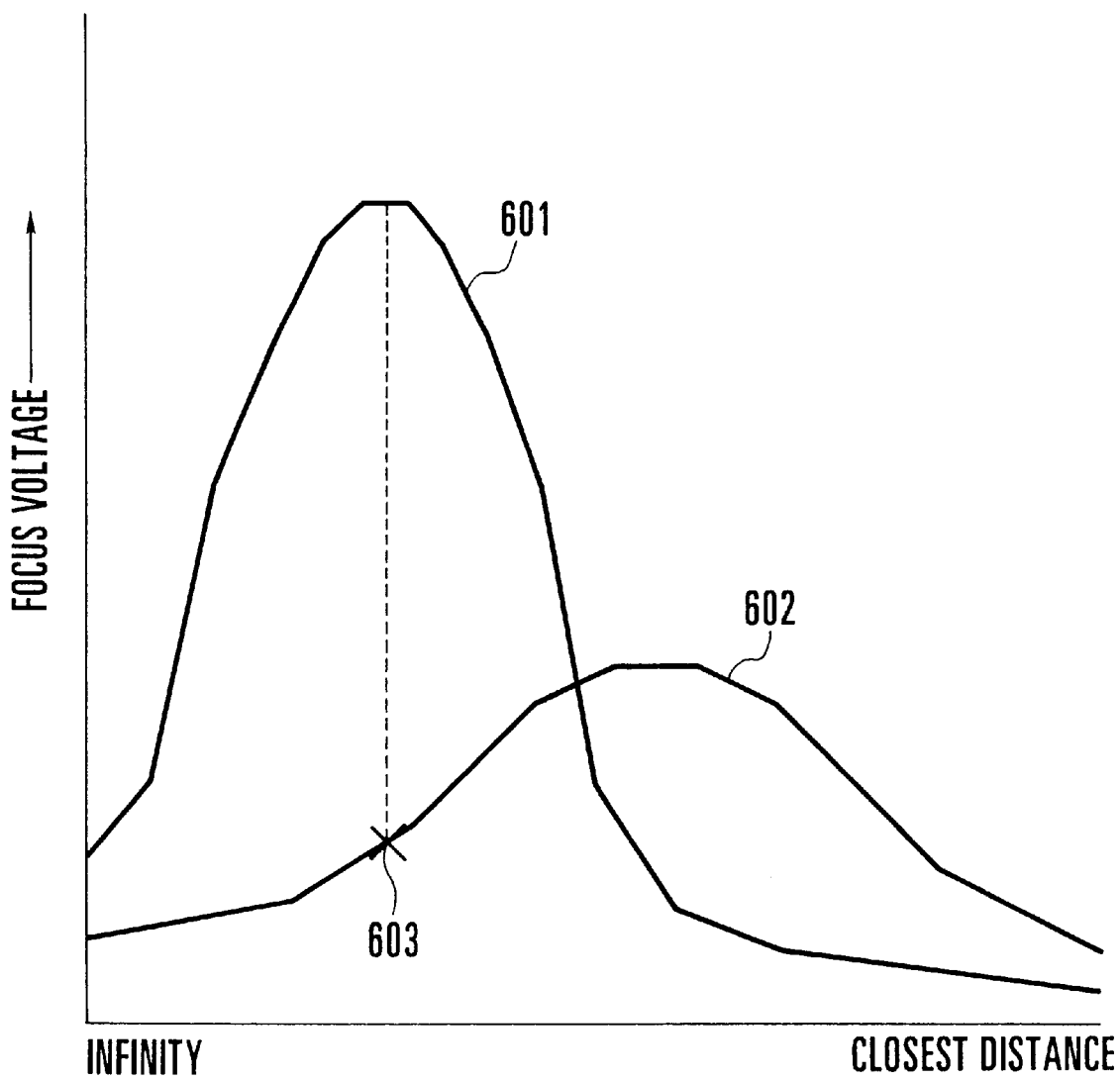
FIG. 20 is a characteristic chart showing the relationship between the position of the focusing lens and focus voltage in connection with FIG. 19.

For example, as shown in FIG. 19, if a person 504 is to be photographed against a background in which a stuffed zebra 505 is present, the respective focus voltages relative to the person 504 and the stuffed zebra 505 are distributed over the entire picture, as shown by characteristic curves 601 and 602 in FIG. 20. Since the stuffed zebra 505 is located far behind the person 504 which is a main subject, the focus voltage 601 relative to the stuffed zebra 505 reaches a peak on a side which is comparatively near to an infinity side, and the peak value is large since the stripes of the stuffed zebra 505 are formed by definite vertical lines. On the other hand, the focus voltage 602 relative to the person 504 reaches a peak on a side which is comparatively near to a closest-distance side, and the peak value is small since the person 504 has vertical lines fewer and less definite than the stuffed zebra 505.

Accordingly, in a case where the focusing lens starts a focusing operation at its infinity end, if the focusing lens performs the operation of coming into focus at a point where the focus voltage reaches the peak, it is apparent that the stuffed zebra 505 is brought into focus but the person 504 is not brought into focus. Even if the focusing lens starts a focusing operation at its closest-distance end, since the "hills" formed by the respective focus voltages overlap each other as shown in FIG. 20, it may not be determined that the peak of the curve 602 corresponds to an in-focus position, and the focusing lens may continue to be moved up to the peak point of the curve 601.

This state in which it is not definitely determined which of a plurality of points located at different distances is to be selected as an in-focus point is called "contention between far focus and near focus". To avoid the contention between far focus and near focus as much as possible and to bring into focus a subject aimed at by a photographer, the technique of providing a distance measuring frame or focus detecting area at a particular position within a picture has heretofore been adopted. In such a technique, on the assumption that many photographers usually position a main subject at the central portion of a picture, the distance measuring frame is provided in the central portion of a picture as shown at 503 in FIG. 19, and only a video signal contained in a portion corresponding to the inside of the distance measuring frame is extracted through gating and the signal contained in the other portion is not used for AF operation.

In accordance with the technique, since no subject located outside of the distance measuring frame 503 is brought into focus, it is possible to eliminate the phenomenon of the stuffed zebra 505 being brought into focus. However, if the subject disappears from the inside of the distance measuring frame 503, for example, if the person 504 of FIG. 19 suddenly moves out of the distance measuring frame 503 and there is no subject behind the person 504, the focus voltage becomes flat, no matter where the focusing lens is located. As a result, it is impossible to find the hill of the focus voltage, such as that shown in FIG. 18 or 20, on the camera side. Accordingly, although the stuffed zebra 505 is present within the picture, the stuffed zebra 505 is not brought into focus and the focusing lens is made to continue to search for an in-focus point between the closest-distance end and the infinity end, thus continuing to search for a peak value of the focus voltage.

An alternative proposed method is the technique of providing, in addition to the distance measuring frame of FIG. 19, a distance measuring frame 502, which differs in size from the distance measuring frame 503, so that distance measurement can be performed by using a focus voltage relative to a subject located inside of either one of the distance measuring frames 503 and 502.

Figure 22:
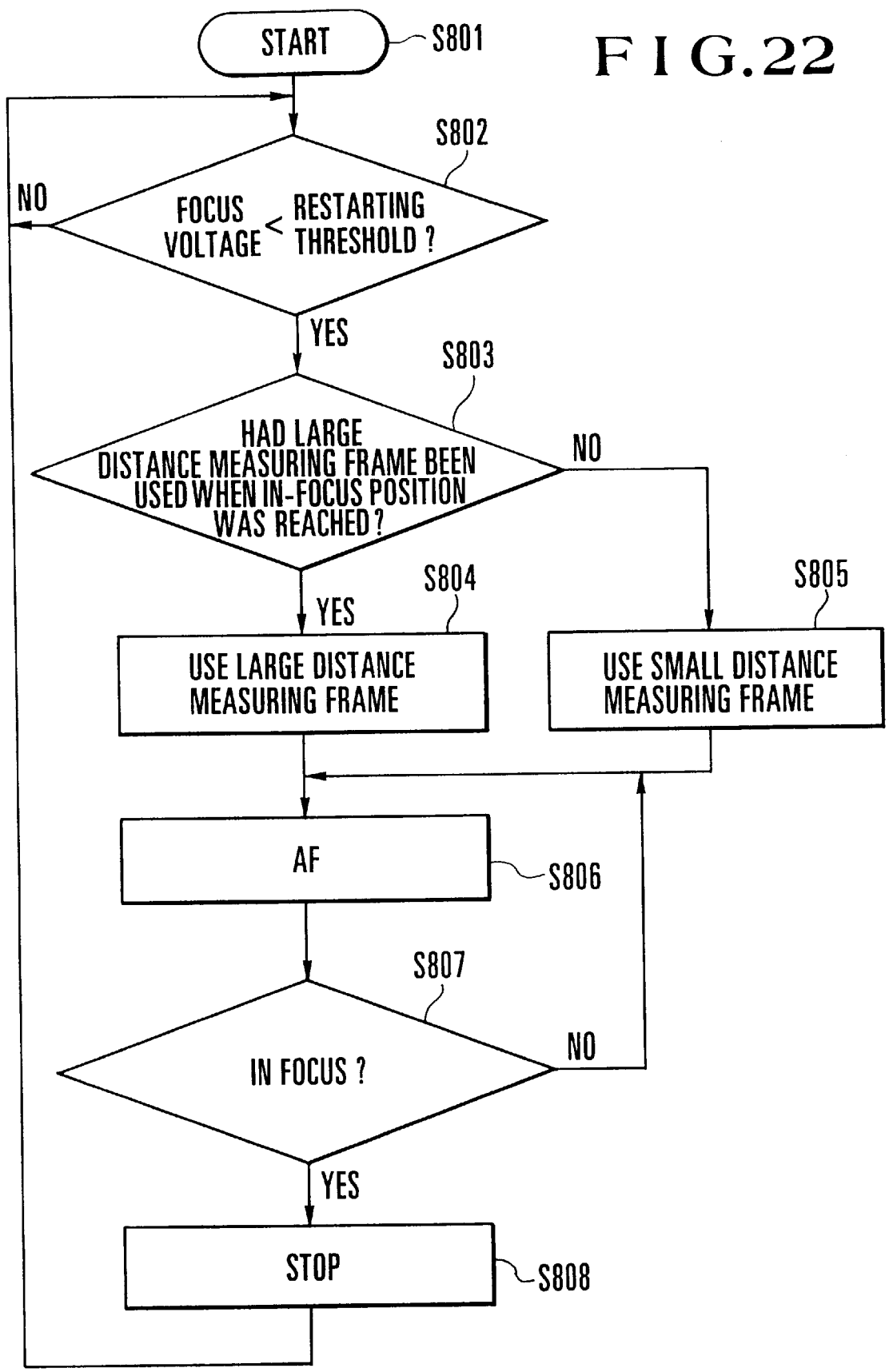
FIG. 22 is a flowchart aiding in describing the restarting operation of a related-art automatic focus adjusting device in connection with FIG. 19.

FIG. 22 is a flowchart showing basic processing for executing AF using the distance measuring frames 503 and 502 of different sizes.

FIG. 22 shows an AF operation which is executed when the focusing lens is to be moved from an in-focus position toward another position for bringing into focus a subject located at a different distance. Referring to FIG. 22, when the process is started in Step S801, it is determined in Step S802 whether a focus voltage is lower than a restarting threshold. As can be seen from FIG. 21, the restarting threshold is set as a threshold 333 with respect to the curve of the focus voltage, and if the focus voltage obtained when the focusing lens is in focus is lower than the restarting threshold 333, it is determined that a subject to be photographed has definitely moved or a photographer has turned the camera toward another subject which is located at a different distance, and the driving of the focusing lens is restarted.

If it is determined in Step S802 that the focus voltage is not lower than the restarting threshold 333, the driving of the focusing lens is not restarted to maintain the in-focus state, and the decision operation of Step S802 is continued. If the focus voltage is lower than the restarting threshold, it is confirmed in Step S803 which of a large distance measuring frame, such as the distance measuring frame 502, and a small distance measuring frame, such as the distance measuring frame 503, had been active when the focusing lens was in focus. If the large distance measuring frame had been active when the focusing lens was in focus, it is determined in Step S804 that the driving of the focusing lens is to be restarted with the large distance measuring frame active. This is because if the large distance measuring frame is active when the focusing lens is in focus, in many cases, the AF system is continuing to track a subject which can be brought into correct focus by using the large distance measuring frame (for example, a scene in which no subject is present in the central portion of the picture). If the small distance measuring frame had been active when the focusing lens was in focus, it is determined in Step S805 that the driving of the focusing lens is to be restarted with the small distance measuring frame active.

After the distance measuring frame having the desired size has been determined in the above-described manner, an AF operation is performed in Step S806 and is repeated until it is determined in Step S807 that the focusing lens has reached an in-focus position. Then, if it is determined in Step S807 that the focusing lens has reached an in-focus position, the focusing lens is stopped in Step S808, and the process returns to the processing of Step S802 and waits for the restarting condition to be satisfied.

By executing the above-described operation, it is possible to determine an appropriate distance measuring frame to be used while the photographer is continuing to track the subject. Since the two distance measuring frames are selectively used, if the subject is present in the central portion of the picture, the central subject is brought into focus, while if no subject is present in the central portion of the picture, a subject which is present outside of the central portion is brought into focus. Accordingly, it is possible to prevent occurrence of the problem that although a subject is present in the picture, the focusing lens continues to search for an in-focus point between the infinity end and the closest-distance end without bringing the subject into focus.

In the above-described example, by selectively using the large distance measuring frame and the small distance measuring frame, it is possible to achieve the advantage that the probability that a subject located in the central portion of the picture is brought into focus becomes high even if contention between far focus and near focus occurs with respect to the subject, as well as the advantage that if the subject leaves the central portion of the picture, it is possible to easily bring another subject into focus. However, since which of the large and small distance measuring frames is to be used is determined by the state of a subject or a distance measuring frame before restarting, there is the problem that if the driving of the focusing lens is restarted and an AF operation is performed on a subject which is present outside of the central portion of the picture, the focusing lens is made to stop at an in-focus point relative to the subject.

In other words, by preparing a plurality of distance measuring frames, it is possible to raise the probability that a subject present in the central portion of the picture is brought into focus even if contention between far focus and near focus occurs with respect to the subject. However, there remains the problem that it has not yet been possible to achieve subject discrimination performance which can satisfy photographers.

A further problem is that after a subject which is present outside of the central portion of the picture has been brought into focus, if a photographer moves the camera, as by panning, to bring another subject present in the central portion of the picture into focus, the probability that the subject present outside of the central portion of the picture is again brought into focus is high as far as restarting of the driving of the focusing lens is executed on the basis of a distance measuring frame used before the restarting.

The seventh embodiment has been made to solve the above-described problems, and in accordance with one feature of the seventh embodiment, there is provided an automatic focus adjusting device which comprises distance measuring area setting means for setting in a picture a plurality of distance measuring areas including a first distance measuring area and a second distance measuring area which differs in size from the first distance measuring area, discriminating means for discriminating a state of focus relative to each of the first and second distance measuring areas before a focus adjusting operation is started by driving an optical element for focus adjustment when the optical element is in an in-focus state, and selecting means for selecting, on the basis of an output of the discriminating means, a distance measuring area to be used after the focus adjusting operation is started.

In accordance with another feature of the seventh embodiment, there is provided an automatic focus adjusting device which comprises distance measuring area setting means for setting in a picture a plurality of distance measuring areas including a first distance measuring area having a higher priority and a second distance measuring area which has a lower priority than the first distance measuring area, distance measuring area selecting means for selecting either one of the first distance measuring area and the second distance measuring area before a focus adjusting operation is started by driving an optical element for focus adjustment when the optical element is in an in-focus state, the distance measuring area selecting means being arranged to select the first distance measuring area if a distance measuring area used when the in-focus state was obtained is the first distance measuring area and also to make discriminations, if the distance measuring area used when the in-focus state was obtained is the second distance measuring area, as to a state of focus relative to the first distance measuring area and a state of focus relative to the second distance measuring area and determine a distance measuring area to be used, and control means for executing the focus adjusting operation on the basis of the distance measuring area selected by the distance measuring area selecting means.

In accordance with another feature of the seventh embodiment, there is provided an automatic focus adjusting device which comprises distance measuring area setting means for setting in a picture a plurality of distance measuring areas including a first distance measuring area having a higher priority and a second distance measuring area which has a lower priority than the first distance measuring area, and control means for driving an optical element for focus adjustment to execute a focus adjusting operation, making a decision, when an in-focus state is reached, as to whether a subject the distance to which can be measured is present in the first distance measuring area, and controlling driving of the optical element for focus adjustment on the basis of a result of the decision.

Accordingly, if no subject is present in the central portion of the picture, an AF operation is performed on another subject so that unnecessary hunting of a focusing lens can be prevented. In addition to such a primary advantage, since there is provided means capable of executing the processing of selecting a distance measuring frame before driving of the focusing lens is restarted, and restarting the driving of the focusing lens with an appropriate distance measuring frame selected, while maintaining the operation of preventing unnecessary hunting of the focusing lens. If the focusing lens is in focus with the large distance measuring frame active, the means confirms whether a subject is present in the small distance measuring frame, and determines whether a restarting operation is to be executed. Accordingly, it is possible to achieve subject discrimination performance and AF performance which can satisfy photographers.

An automatic focus adjusting device according to the seventh embodiment of the present invention will be described below in detail.

Figure 15:
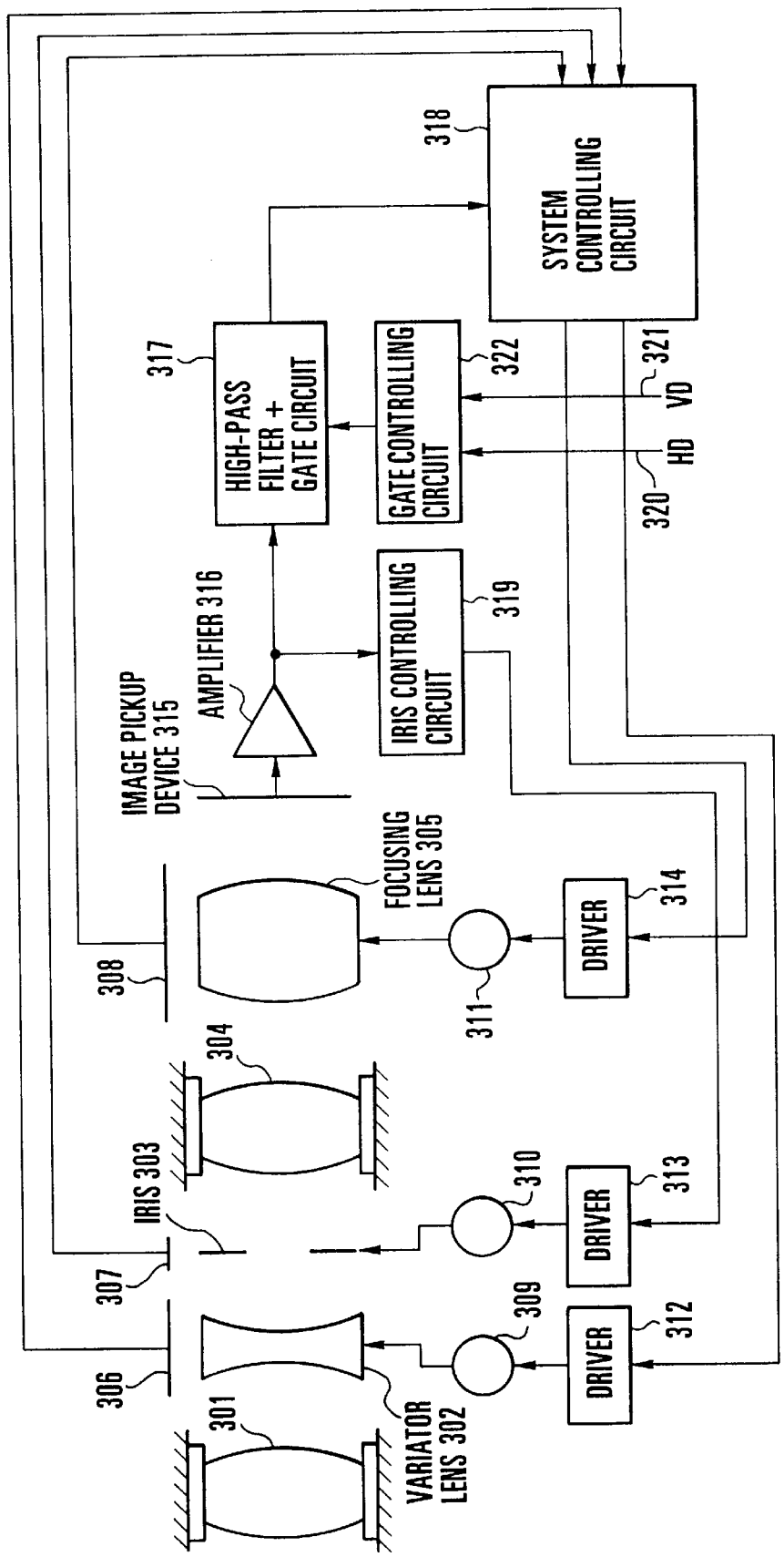
FIG. 15 is a block diagram showing the arrangement of an automatic focus adjusting device according to a seventh embodiment of the present invention.

FIG. 15 is a block diagram showing one example in which the present invention is applied to a video camera using the television AF system. The shown arrangement includes a first lens group 301 which is fixedly disposed, a second lens group (hereinafter referred to as the "variator lens") 302 for performing magnification variation by moving in parallel with the optical axis, an iris 303, a third lens group 304 which is fixedly disposed, a fourth lens group (hereinafter referred to as the "focusing lens") 305 having the focusing function of performing focusing by moving in parallel with the optical axis and the compensation function of preventing a movement of a focal plane due to magnification variation by performing a compensation operation according to a movement of the variator lens 302, encoders 306, 307 and 308 for respectively detecting the positions, the amounts of movement, etc., of the variator lens 302, the iris 303 and the focusing lens 305, actuators 309, 310 and 311 for respectively driving the variator lens 302, the iris 303 and the focusing lens 305, drivers 312, 313 and 314 for driving the actuators 309, 310 and 311, an image pickup device 315 such as a CCD, and an amplifier 316.

The shown arrangement also includes a gate circuit+band-pass filter 317 and a system controlling circuit 318. The gate circuit+band-pass filter 317 includes a band-pass filter for passing a high-frequency component contained in the output signal of the amplifier 316 and a gate circuit for setting a distance measuring frame in a picture by passing the high-frequency component contained in the output signal of the amplifier 316 for a time period specified by a gate controlling circuit 322 which will be described later. The system controlling circuit 318 is made up of a microcomputer and other associated elements. The system controlling circuit 318 receives from the gate circuit+band-pass filter 317 the high-frequency component signal contained in a portion corresponding to the inside of the distance measuring frame, i.e., a focus voltage, performs A/D conversion of the focus voltage, and drives and controls the focusing lens 305 on the basis of the resultant value, thereby moving the focusing lens 305 up to an in-focus point. The system controlling circuit 318 also controls the gate controlling circuit 322 to control the position and size of the distance measuring frame, as will be described later.

The shown arrangement also includes an iris controlling circuit 319 for controlling the driver 313 and the actuator 310 so as to make constant the average value of the luminance signal levels of the output signals of the amplifier 316, thereby adjusting the iris 303 to effect correct exposure of the image pickup surface of the image pickup device 315. Lines 320 and 321 are respectively provided for supplying a horizontal synchronizing signal HD and a vertical synchronizing signal VD to the gate controlling circuit 322. The gate controlling circuit 322 is internally provided with components such as counters for the horizontal synchronizing signal HD and the vertical synchronizing signal VD, and controls the gate circuit+band-pass filter 317 to cause the gate circuit to set a distance measuring frame in a picture and open so that a high-frequency component can be extracted from only the area of the distance measuring frame. The gate controlling circuit 322 is controlled by the system controlling circuit 318.

In the television AF system, the image pickup device 315 picks up an image and photoelectrically converts the image into a video signal, and the video signal is amplified by the amplifier 316. In the band-pass filter 317, only a high-frequency component of the video signal is extracted from only the inside of the distance measuring frame set by the gate circuit. As described previously, the level of the high-frequency component shows a peak when the focusing lens reaches an in-focus position, and as the focusing lens defocuses, the level becomes gradually lower. The relationship between the level of the high-frequency component, i.e., the focus voltage, and the position of the focusing lens is similar to that shown in FIG. 18.

In the video camera according to the seventh embodiment as well, the level of a high-frequency component contained in a horizontal scanning signal within the distance measuring frame is extracted by the gate circuit+band-pass filter 317. As a greater number of vertical lines are contained in the picture or as the vertical lines have more definite shades, the focus voltage exhibits a great peak value.

The control algorithm of the system controlling circuit 318 which constitutes a feature of the seventh embodiment will be specifically described below with reference to FIG. 16.

Figure 16:
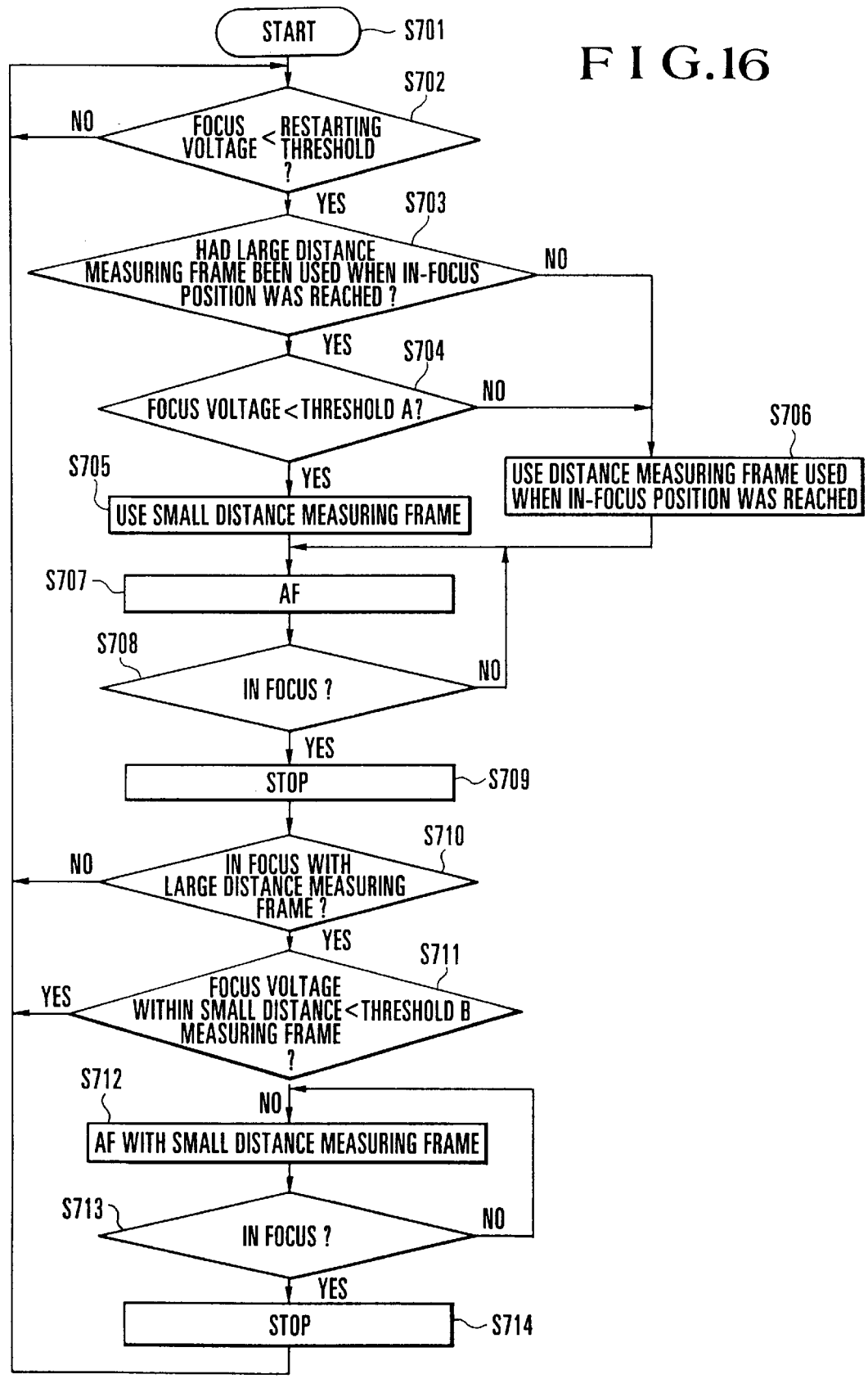
FIG. 16 is a flowchart aiding in describing the control operation of the automatic focus adjusting device according to the seventh embodiment of the present invention.
Figure 21:
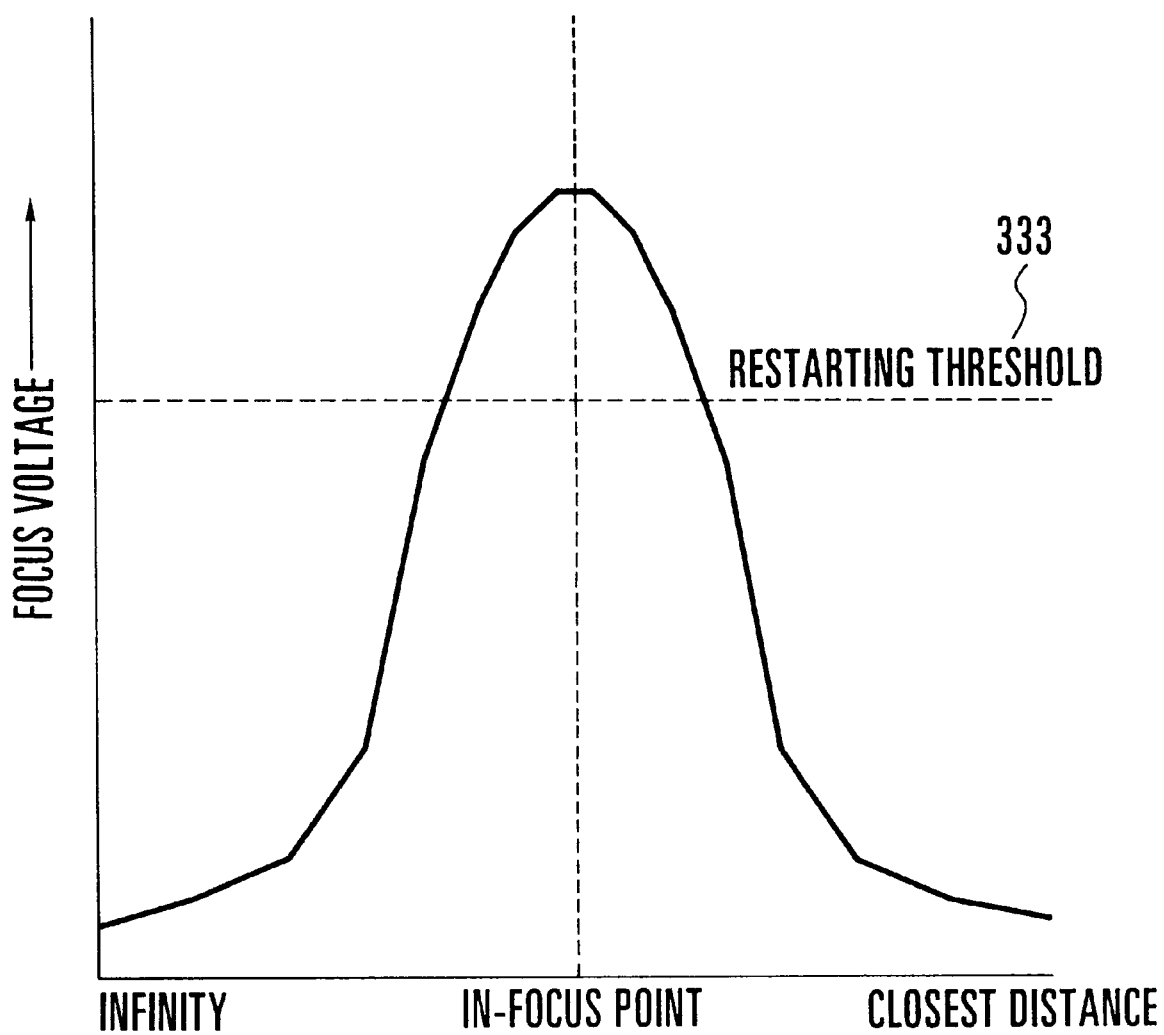
FIG. 21 is a characteristic chart aiding in describing the restarting operation of a general automatic focus adjusting device, and shows the relationship between the position of a focusing lens and focus voltage.

The processing shown in FIG. 16 is started when the focusing lens is in the state of waiting for restarting conditions to be satisfied after the focusing lens has come into-focus and stopped at the in-focus position. Incidentally, when the focusing lens is in such a state, a focus voltage is made lower than the threshold 333 as shown in FIG. 21, as the result of, for example, a movement of a subject or the video camera.

When the processing is started in Step S701, it is confirmed in Step S702 whether the focus voltage is lower than the restarting threshold 333, similarly to the flowchart shown in FIG. 22. If the focus voltage is not lower than the restarting threshold 333, the process waits in Step S702 until the focus voltage becomes lower than the restarting threshold 333. If the focus voltage is lower than the restarting threshold 333, the process proceeds to the processing of Step S703.

In Step S703, it is confirmed whether the large distance measuring frame had been used when the focusing lens came into focus. In the case of the large distance measuring frame, the process proceeds to Step S404, in which it is confirmed whether a focus voltage relative to the large distance measuring frame is lower than a threshold A indicated by 332 in FIG. 15.

If the focus voltage relative to the large distance measuring frame is lower than the threshold A at the time of restarting, it can be determined that the entire photographic picture is greatly defocused. For example, it can be presumed that the photographer has turned the camera toward a subject utterly different from the previous subject, a large subject suddenly appeared in front of the camera, or a subject suddenly disappeared in front of the camera. Accordingly, it is not necessary to maintain the state of the distance measuring frame which was set before restarting. For this reason, in this case, the processing of Step S705 is executed to determine that the small distance measuring frame is to be used, for the purpose of preferentially bringing into focus a subject which is currently present in the central portion of the picture.

If it is determined in Step S703 that the distance measuring frame used before restarting is the small distance measuring frame, the distance measuring frame used when the focusing lens came into focus, i.e., the small distance measuring frame, is selected in Step S706.

If it is determined that the distance measuring frame used before restarting is the large distance measuring frame and that the focus voltage is higher than the restarting threshold A, this indicates that a large variation has not yet occurred in a scene which has so far been photographed. Accordingly, in Step S706, the distance measuring frame used when the focusing lens came into focus, i.e., the large distance measuring frame, is selected, and in Step S707 an AF operation is performed while avoiding unnecessary hunting of the focusing lens.

The size of a distance measuring frame to be used at the time of restarting is selected in this manner, and the AF operation is performed in Step S707. The AF operation is continued until it is determined in Step S708 that the focusing lens has reached an in-focus position. If the focusing lens reaches the in-focus position, the focusing lens is made to stop in Step S709.

After the AF operation has been completed in Step S709, it is confirmed in Step S710 whether the focusing lens has stopped at the in-focus position with the large distance measuring frame active. If the focusing lens has stopped at the in-focus position with the small distance measuring frame active, it is determined that a subject which is present in the central portion of the picture is in focus, and the process returns to Step S702 and the focusing lens returns to the state of waiting for restarting conditions to be satisfied.

Figure 17:
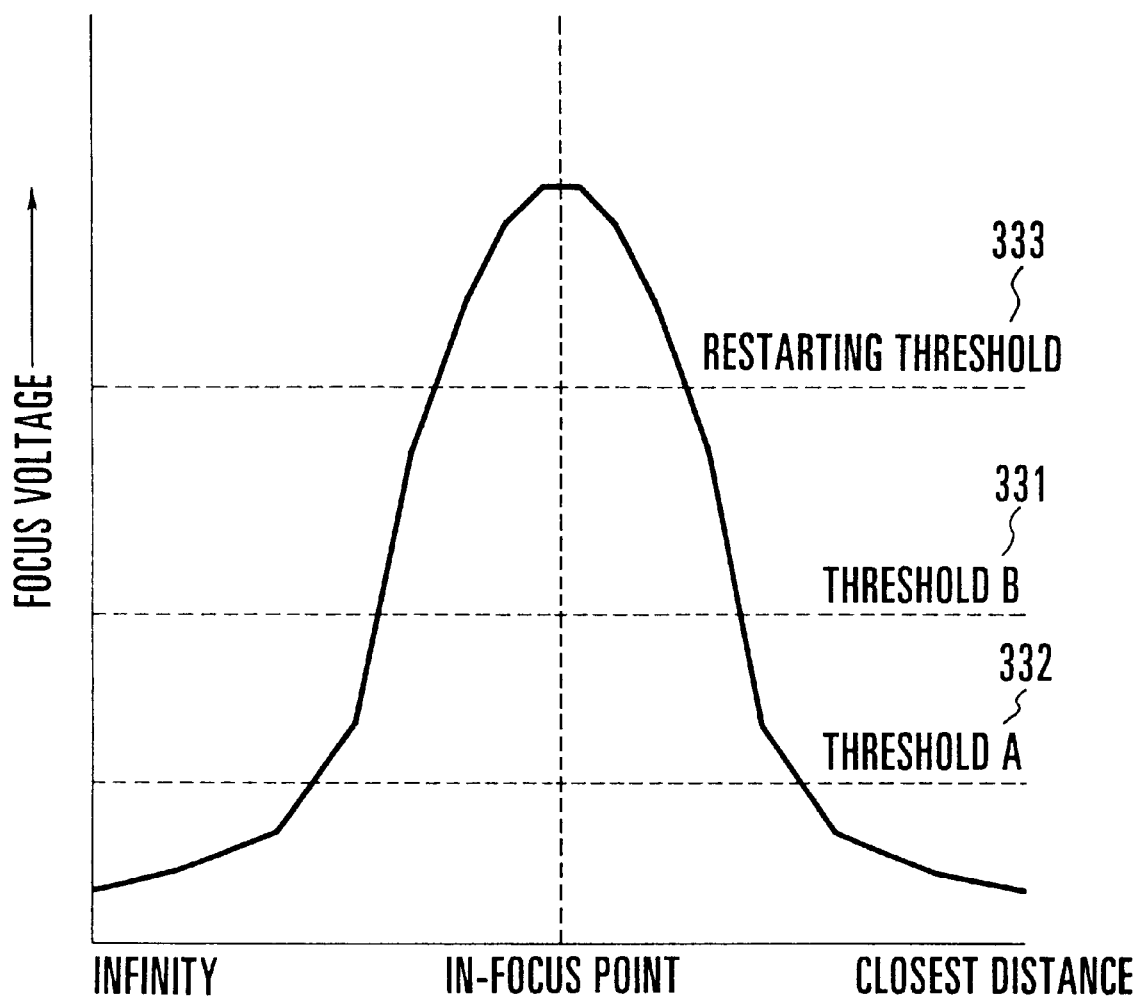
FIG. 17 is a characteristic chart aiding in describing the restarting operation of the automatic focus adjusting device according to the seventh embodiment of the present invention, and shows the relationship between the position of a focusing lens and focus voltage.

If it is determined in Step S710 that the focusing lens has stopped at the in-focus position with the large distance measuring frame active, a focus voltage relative to the small distance measuring frame is confirmed in Step S711. Even if the focusing lens has stopped at a position where a subject which is present outside of the small distance measuring frame is in focus with the large distance measuring frame active, if another subject is present within the small distance measuring frame in a defocused state, a finite amount of focus voltage can be detected within the small distance measuring frame, as shown at 603 in FIG. 20. In Step S711, if the focus voltage relative to the small distance measuring frame is higher than a threshold B indicated by 331 in FIG. 17 (the threshold B>the threshold A), it is determined that although a subject is present in the small distance measuring frame, a subject which is present outside of the small distance measuring frame is in focus. Then, in Steps S712, S713 and 5714, only the small distance measuring frame is used to perform another AF operation so that the focusing lens can stop at a desired in-focus position.

In Step S711, if the focus voltage relative to the small distance measuring frame is lower than the threshold B, it is determined that the in-focus point at which the focusing lens came into focus with the large distance measuring frame active is correct. The process returns to the processing of Step S702.

The threshold B is preferably set to a value on the basis of which it is possible to determine that a definite peak point of the hill is difficult to find because no subject is present in the small distance measuring frame or because the hill of a focus voltage relative to a subject which is present in the small distance measuring frame is considerably flat.

As is apparent from the above description, in the seventh embodiment, in addition to the AF operation and the distance measuring frame selecting processing both of which have been described previously, two kinds of processing are executed: the processing of making a selection from the distance measuring frames before restarting by using two thresholds and the processing of confirming whether a subject is present in the small distance measuring frame used when an in-focus state is reached. Accordingly, even if a subject indicative of a focus voltage having a great peak is present in the large distance measuring frame, it is possible to extremely raise the priority with which a subject present in the central portion of the picture is brought into focus. Accordingly, it is possible to compatibly achieve subject discrimination performance and AF performance which can satisfy photographers.

If no subject is present in the central portion of the picture, an AF operation is performed on a subject present outside of the central portion of the picture in the manner described previously. Accordingly, there is no risk of impairing the known advantage of AF, i.e., it is possible to achieve a stable lens behavior even in the case of a scene in which no subject is present in the central portion of the picture.

As is apparent from the above description, in accordance with the seventh embodiment, by confirming whether the size of a distance measuring frame used when an in-focus state is reached needs to be maintained at the time of restarting, as well as whether a subject is present in the small distance measuring frame in the center of the picture after the in-focus state is reached, it is possible to enhance the stability of a lens operation by bringing into focus a subject outside of the central portion of the picture if no subject is present in the central portion. In addition, if a scene greatly varies in the picture, an AF operation is preferentially performed on the central portion of the picture in response to such a variation, whereas if a subject is present in the central portion of the picture, the operation of bringing the subject into focus is performed with a raised priority. Accordingly, it is possible to compatibly achieve subject discrimination performance and AF performance which can satisfy photographers.

What is claimed is:

1. A video camera apparatus comprising:
   image pickup means for photoelectrically converting an optical image formed on its image pickup plane into a video signal;
   focus adjusting means for focusing the optical image on the image pickup surface;
   electronic magnification varying means for electronically varying an image magnification by signal processing; and
   control means for controlling an operation of said focus adjusting means in manners which differ between a state wherein the image magnification is varied by said electronic magnification varying means and a state wherein the image magnification is not varied by said electronic magnification varying means.

2. A video camera apparatus according to claim 1, wherein said focus adjusting means includes a focusing lens, and further includes discriminating means for vibrating the focusing lens back and forth on an optical axis and discriminating a state of focus on the basis of a variation of a focus signal which occurs at that time.

3. A video camera apparatus according to claim 2, wherein said control means varies an amplitude of a vibration of the focusing lens according to whether the image magnification is varied by said electronic magnification varying means.

4. A video camera apparatus according to claim 1, wherein said focus controlling means includes a focusing lens, said focus controlling means varying an amount of overshoot of the focusing lens according to whether the image magnification is varied by said electronic magnification varying means.

5. A video camera apparatus according to claim 1, wherein said control means varies a restarting condition of said focus adjusting means according to whether the image magnification is varied by said electronic magnification varying means.

6. A video camera apparatus according to claim 1, wherein said control means varies a focusing speed according to whether the image magnification is varied by said electronic magnification varying means.

7. A video camera apparatus comprising:
   image pickup means for photoelectrically converting an optical image formed on its image pickup plane into a video signal;
   focus adjusting means for focusing the optical image on the image pickup surface;
   electronic magnification varying means for electronically varying an image magnification by signal processing; and
   control means for controlling an operation of said focus adjusting means in different manners according to an image magnification of said electronic magnification varying means.

8. A video camera apparatus according to claim 7, wherein said focus adjusting means includes a focusing lens, and further includes discriminating means for vibrating the focusing lens back and forth on an optical axis and discriminating a state of focus on the basis of a variation of a focus signal which occurs at that time.

9. A video camera apparatus according to claim 8, wherein said control means varies an amplitude of a vibration of the focusing lens according to the image magnification of said electronic magnification varying means.

10. A video camera apparatus according to claim 7, wherein said focus controlling means includes a focusing lens, said focus controlling means varying an amount of overshoot of the focusing lens according to the image magnification of said electronic magnification varying means.

11. A video camera apparatus according to claim 7, wherein said control means varies a restarting condition of said focus adjusting means according to the image magnification of said electronic magnification varying means.

12. A video camera apparatus according to claim 7, wherein said control means varies a focusing speed according to the image magnification of said electronic magnification varying means.

13. A video camera apparatus comprising:
   image pickup means for photoelectrically converting an optical image formed on its image pickup plane into a video signal;
   focus adjusting means for focusing the optical image on the image pickup surface;
   electronic magnification varying means for electronically varying an image magnification by signal processing; and
   control means for controlling said focus adjusting means in different manners according to whether said electronic magnification varying means is in operation.

14. A video camera apparatus according to claim 13, wherein said focus adjusting means includes a focusing lens, and further includes discriminating means for vibrating the focusing lens back and forth on an optical axis and discriminating a state of focus on the basis of a variation of a focus signal which occurs at that time.

15. A video camera apparatus according to claim 14, wherein said control means varies an amplitude of a vibration of the focusing lens according to whether said electronic magnification varying means is in operation.

16. A video camera apparatus according to claim 13, wherein said focus controlling means includes a focusing lens, said focus controlling means varying an amount of overshoot of the focusing lens according to whether said electronic magnification varying means is in operation.

17. A video camera apparatus according to claim 13, wherein said control means varies a restarting condition of said focus adjusting means according to whether said electronic magnification varying means is in operation.

18. A video camera apparatus according to claim 13, wherein said control means varies a focusing speed according to whether said electronic magnification varying means is in operation.

* * * * *

UNITED STATES PATENT AND TRADEMARK OFFICE
CERTIFICATE OF CORRECTION

PATENT NO. : 5,933,187
DATED : August 3, 1999
INVENTOR(S) : Masahide Hirasawa, et al.

It is certified that error appears in the above-indentified patent and that said Letters Patent is hereby corrected as shown below:

Col. 1, line 7, after "May" delete "5.".

Col. 12, line 11, delete "bee" and insert --been--.

Col. 13, line 54, delete "No" and insert --NO--.

Col. 18, line 59, delete "specifically" and insert --Specifically--.

Col. 25, line 47, after Step delete "8" and insert --S--.

Signed and Sealed this

Tenth Day of April, 2001

*Attest:*

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO. : 5,933,187
DATED : August 3, 1999
INVENTOR(S) : Masahide Hirasawa, et al.

Page 1 of 1

It is certified that error appears in the above-identified patent and that said Letters Patent is hereby corrected as shown below:

Column 1,
Line 7, after "May" delete "5.".

Column 12,
Line 11, delete "bee" and insert --been--.

Column 13,
Line 54, delete "No" and insert --NO--.

Column 18,
Line 59, delete "specifically" and insert --Specifically--.

Column 25,
Line 47, after Step delete "8" and insert --S--.

Signed and Sealed this

Nineteenth Day of June, 2001

*Attest:*

NICHOLAS P. GODICI
*Attesting Officer*  *Acting Director of the United States Patent and Trademark Office*